(12) United States Patent
Hammonds et al.

(10) Patent No.: US 7,246,502 B2
(45) Date of Patent: Jul. 24, 2007

(54) SELF-CONTAINED FLUSH-MOUNT BULKHEAD AIR CONDITIONING UNIT WITH NOVEL EVAPORATOR/BLOWER ASSEMBLY HOUSING

(75) Inventors: David R. Hammonds, York, PA (US); David E. Whitesel, Dallastown, PA (US)

(73) Assignee: Trans/Air Manufacturing Corp, Dallastown, PA (US)

( * ) Notice: Subject to any disclaimer, the term of this patent is extended or adjusted under 35 U.S.C. 154(b) by 7 days.

(21) Appl. No.: 11/008,966

(22) Filed: Dec. 13, 2004

(65) Prior Publication Data
US 2005/0126216 A1      Jun. 16, 2005

Related U.S. Application Data

(60) Provisional application No. 60/528,867, filed on Dec. 12, 2003.

(51) Int. Cl.
B60H 1/32 (2006.01)
(52) U.S. Cl. .............................. 62/244; 165/42; 62/426
(58) Field of Classification Search .......... 62/239–244, 62/419, 426; 165/42–43
See application file for complete search history.

(56) References Cited

U.S. PATENT DOCUMENTS

| | | | | |
|---|---|---|---|---|
| 3,918,271 A | * | 11/1975 | Whisler ........................ | 62/285 |
| 4,201,064 A | | 5/1980 | Krug et al. | |
| 4,507,131 A | * | 3/1985 | Fathauer et al. ................ | 96/21 |
| 4,622,831 A | | 11/1986 | Grupa | |
| 4,727,728 A | | 3/1988 | Brown | |
| 4,748,825 A | | 6/1988 | King | |
| 4,787,210 A | | 11/1988 | Brown | |
| 4,811,569 A | * | 3/1989 | Welch et al. ................. | 62/239 |
| 4,870,833 A | | 10/1989 | Matsuda et al. | |
| 4,888,959 A | * | 12/1989 | Brown ........................ | 62/244 |
| 4,926,655 A | | 5/1990 | King | |
| 4,967,569 A | * | 11/1990 | Machen et al. ............... | 62/240 |
| 5,001,905 A | | 3/1991 | Miyazaki | |
| 5,005,372 A | * | 4/1991 | King ............................ | 62/244 |
| 5,046,327 A | * | 9/1991 | Walker et al. ................ | 62/244 |
| 5,123,257 A | * | 6/1992 | Anderson et al. ............. | 62/236 |
| 5,184,474 A | | 2/1993 | Ferdows | |
| 5,220,808 A | | 6/1993 | Mayer | |
| 5,428,967 A | | 7/1995 | Goto et al. | |
| 5,605,055 A | | 2/1997 | Salgado | |
| 5,609,037 A | | 3/1997 | Fischler | |

(Continued)

OTHER PUBLICATIONS

Carrier, "RM 55 Rearmount Air Conditioning System".

*Primary Examiner*—William E. Tapolcai
(74) *Attorney, Agent, or Firm*—Jacobson Holman PLLC

(57) ABSTRACT

An air conditioning unit having a flush-mounted self-contained evaporator assembly adapted for mounting into the front or rear bulkhead of a bus or similar type vehicle. The evaporator assembly includes a specially designed housing to provide a compact self-contained unit that can fit in a small space, such as the bulkhead above a passenger compartment, while the associated compressor and condenser units are distally located. The housing has chamfered top surfaces so as to provide additional clearance within the bulkhead during installation, and a floor pan with two sloping surfaces forming an inverted apex. Lateral drains located at both ends of the apex facilitate drainage of condensate from the unit when the vehicle is in motion or in a non-level stationary position.

24 Claims, 25 Drawing Sheets

U.S. PATENT DOCUMENTS 5,678,761 A    10/1997  Ikeda
6,282,912 B1 *  9/2001  Mannerheim ................ 62/244
6,295,826 B1   10/2001  Lee
6,374,626 B1 *  4/2002  Takahashi .................... 62/239
6,494,052 B1   12/2002  Lee

* cited by examiner

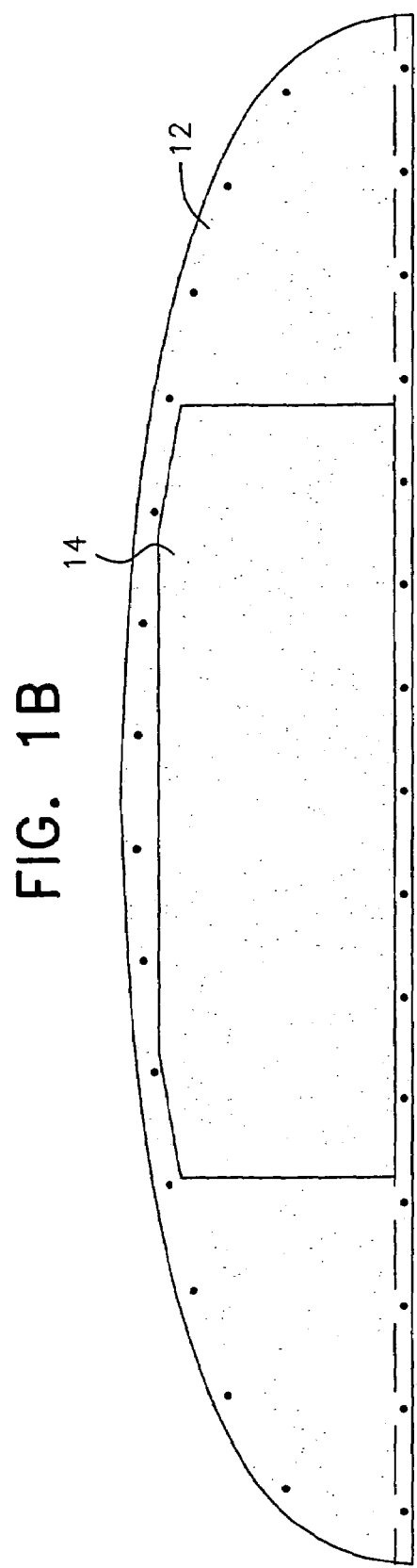

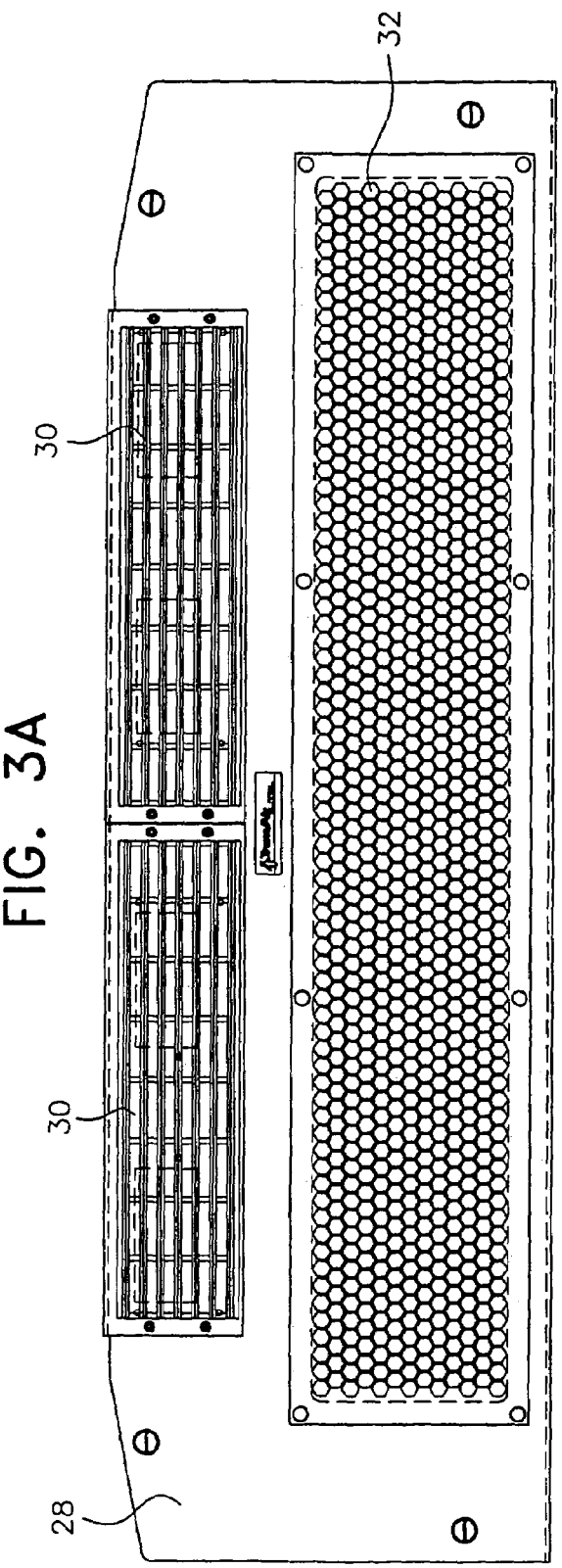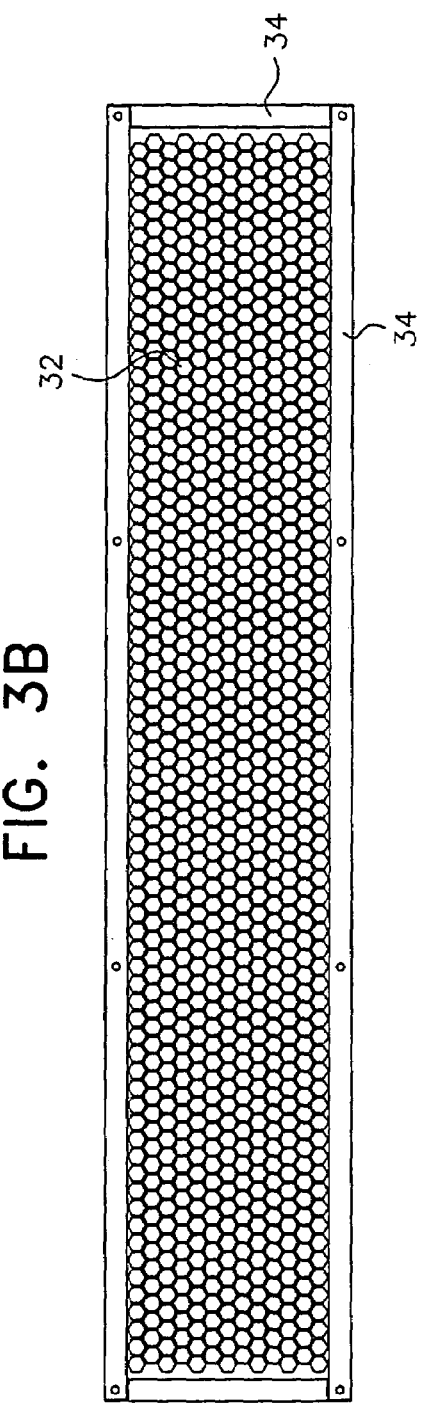
FIG. 3A
FIG. 3B

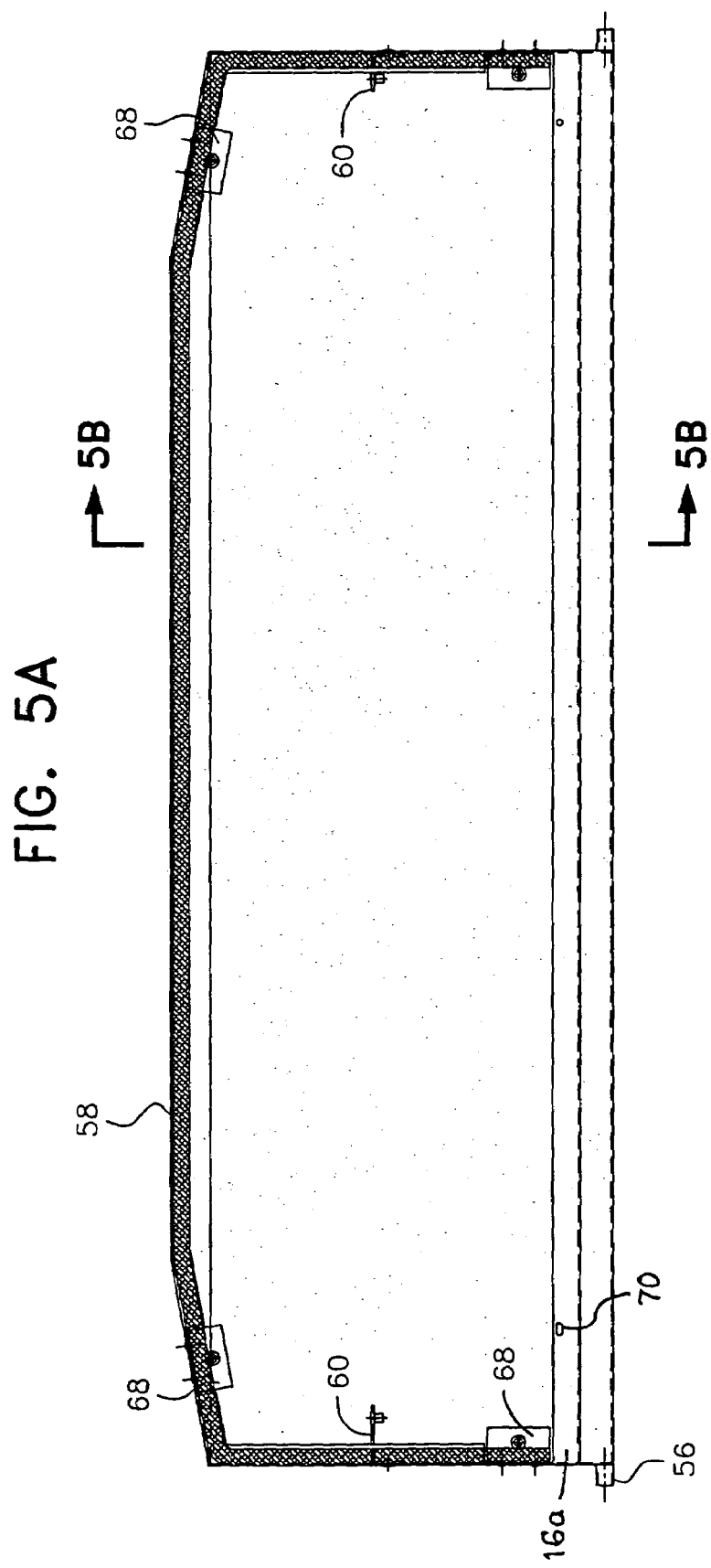

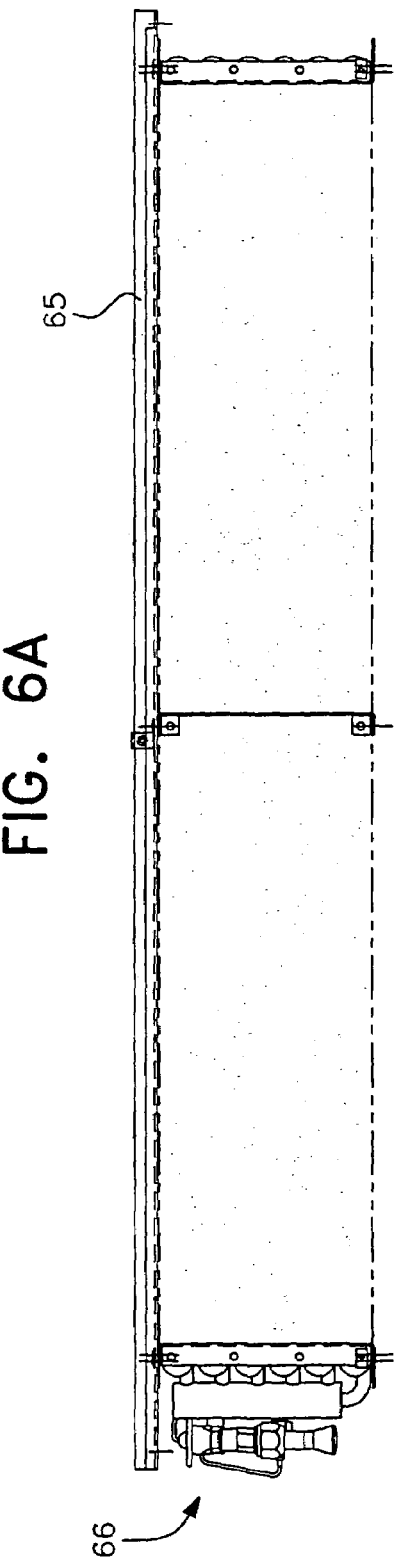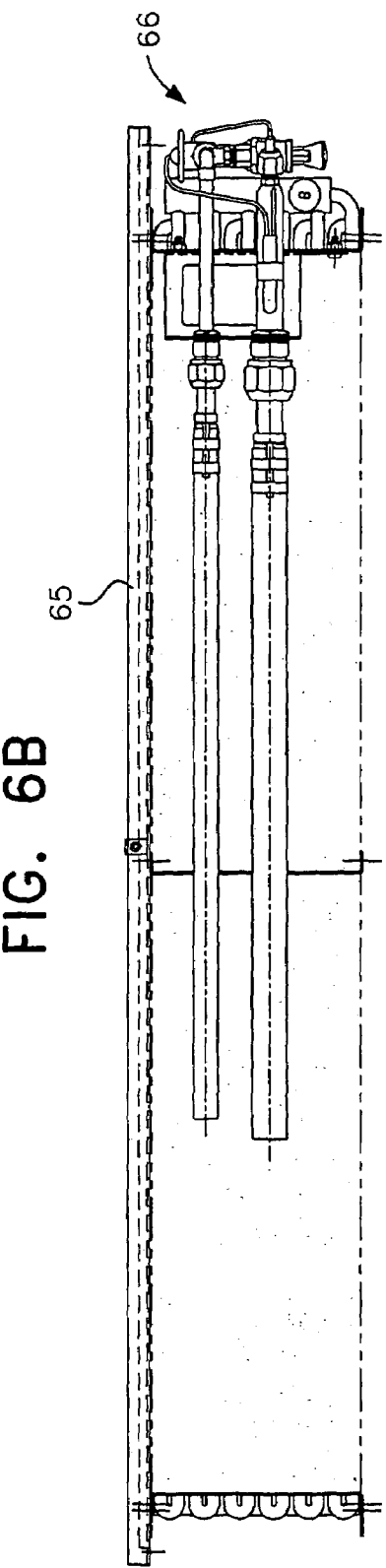

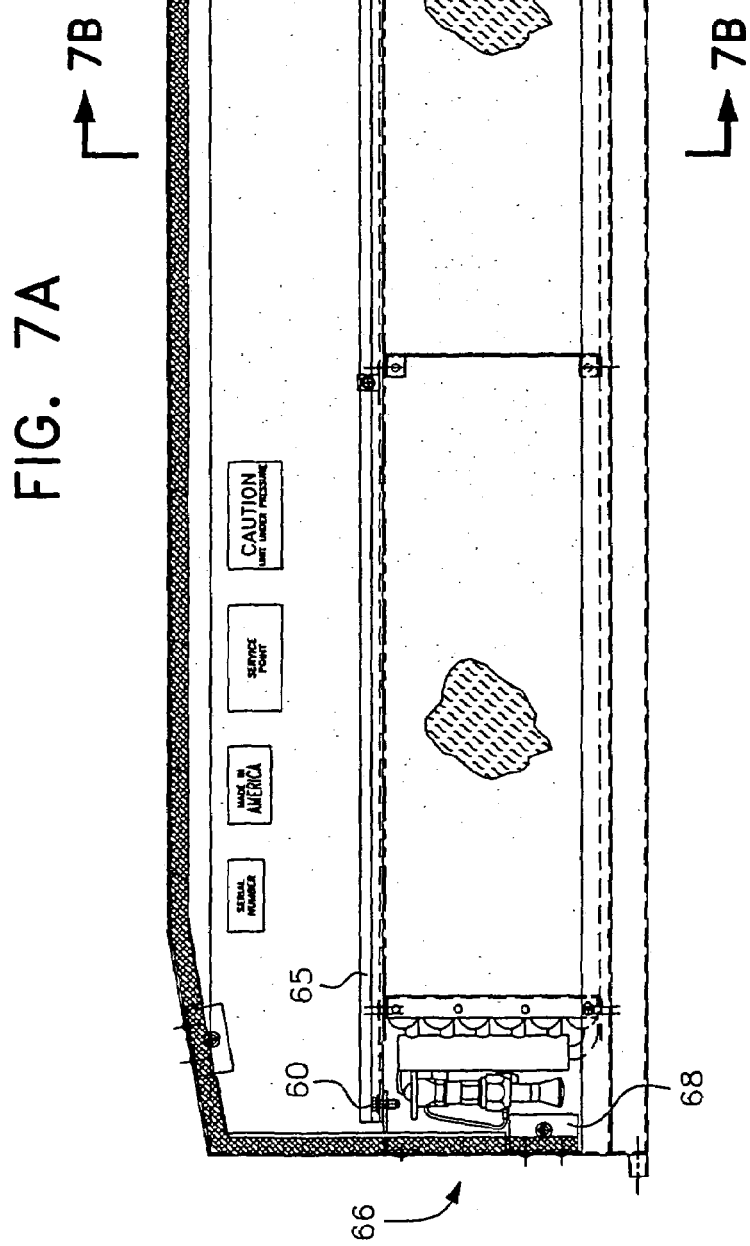

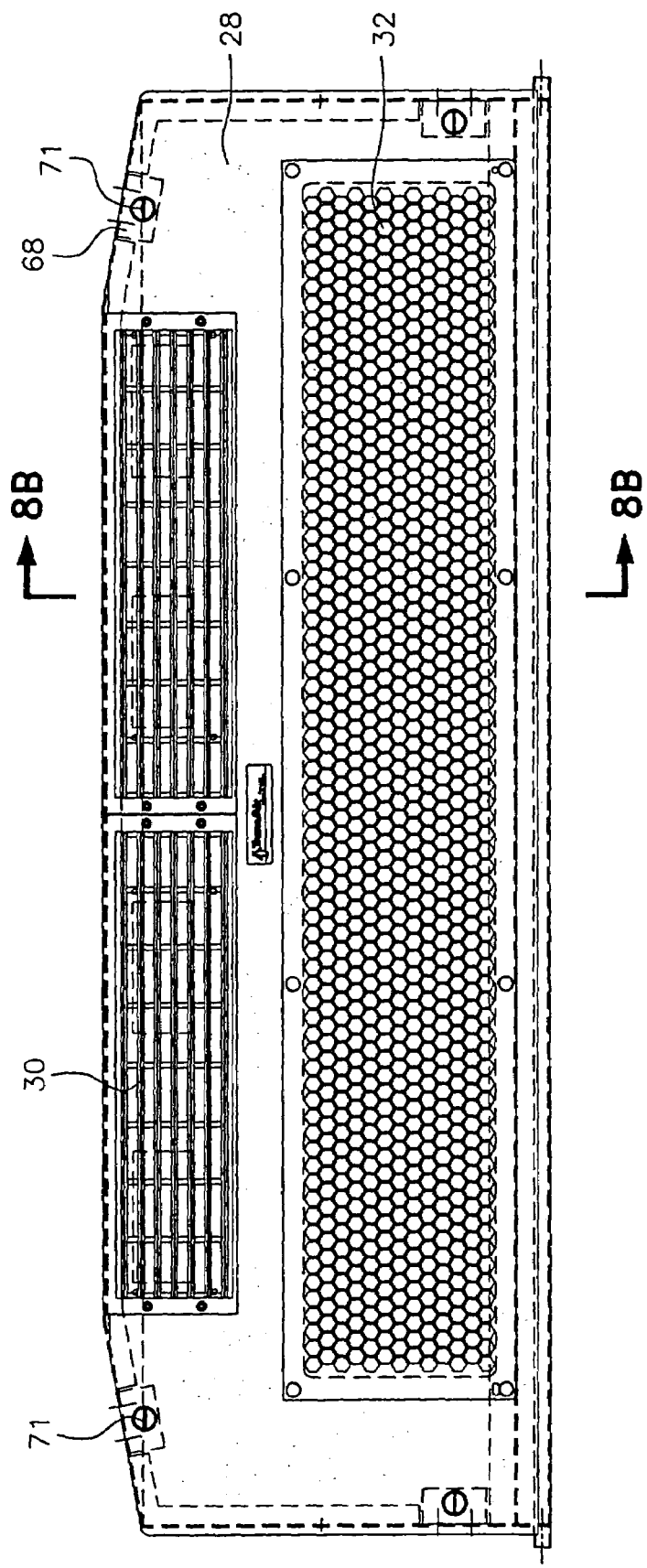

FIG. 10A
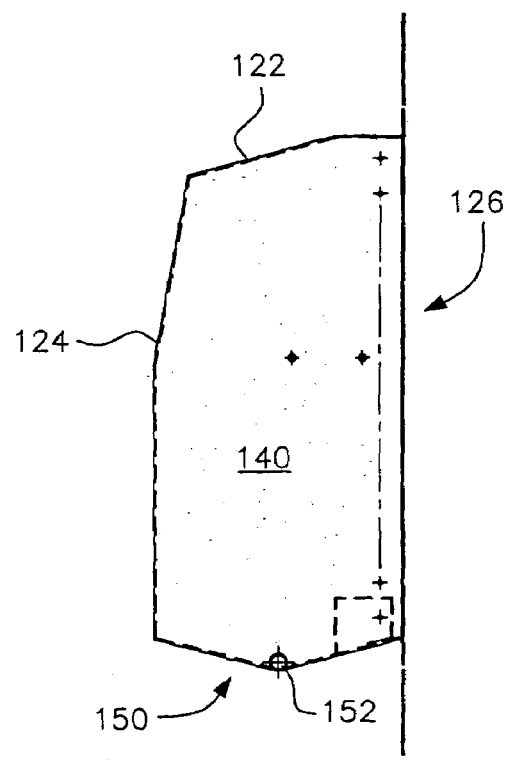
FIG. 10B
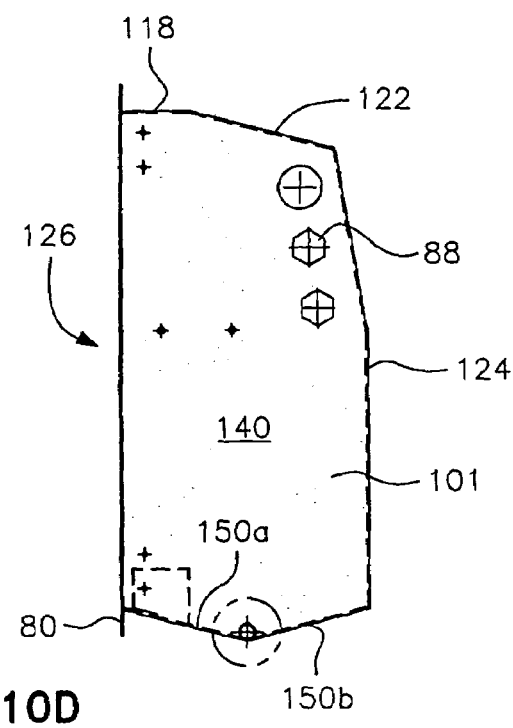
FIG. 10C
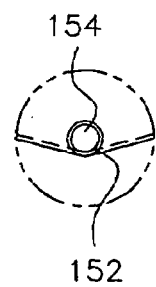
10D
10D

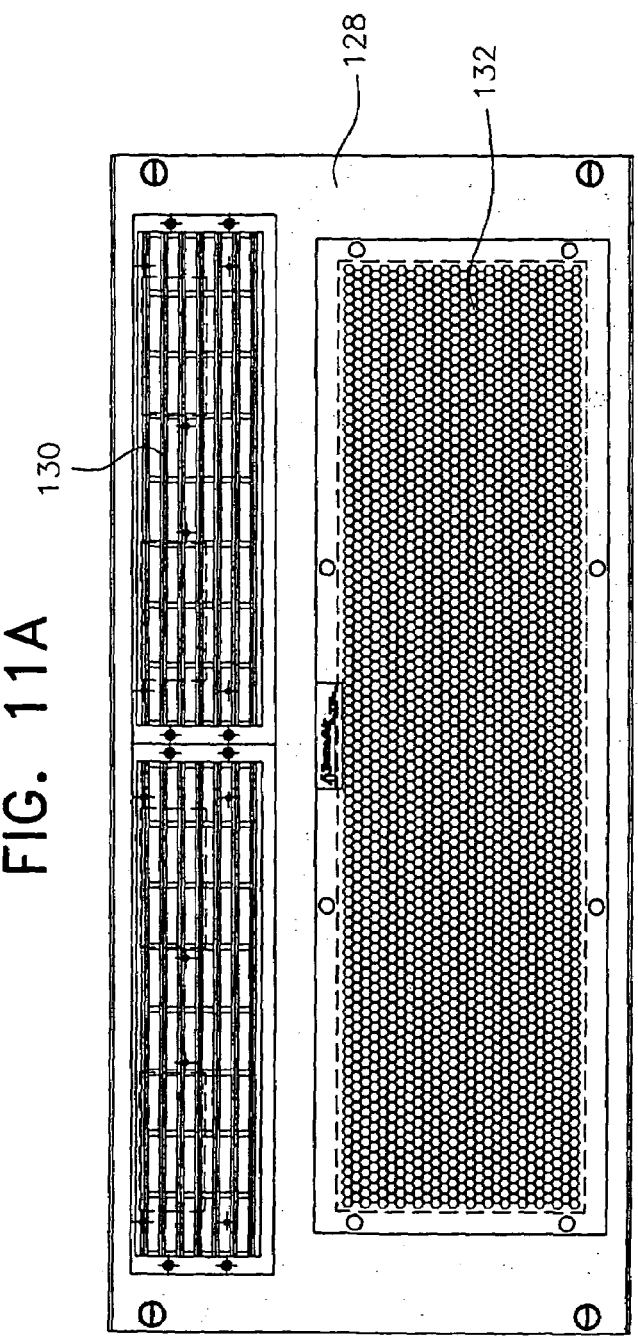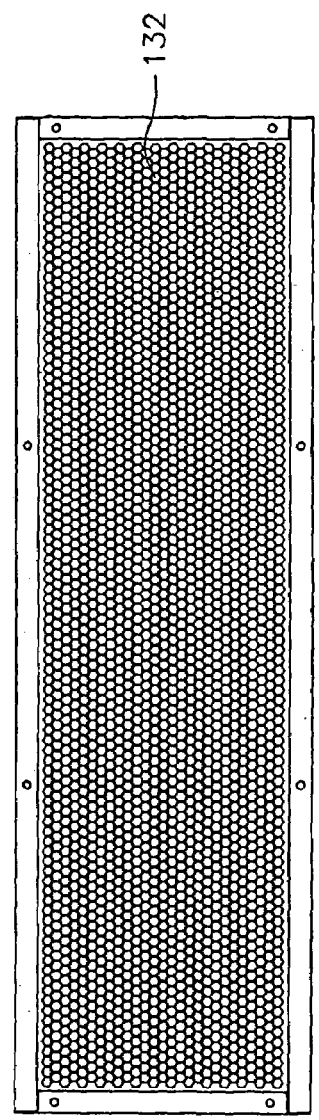
FIG. 11A
FIG. 11B

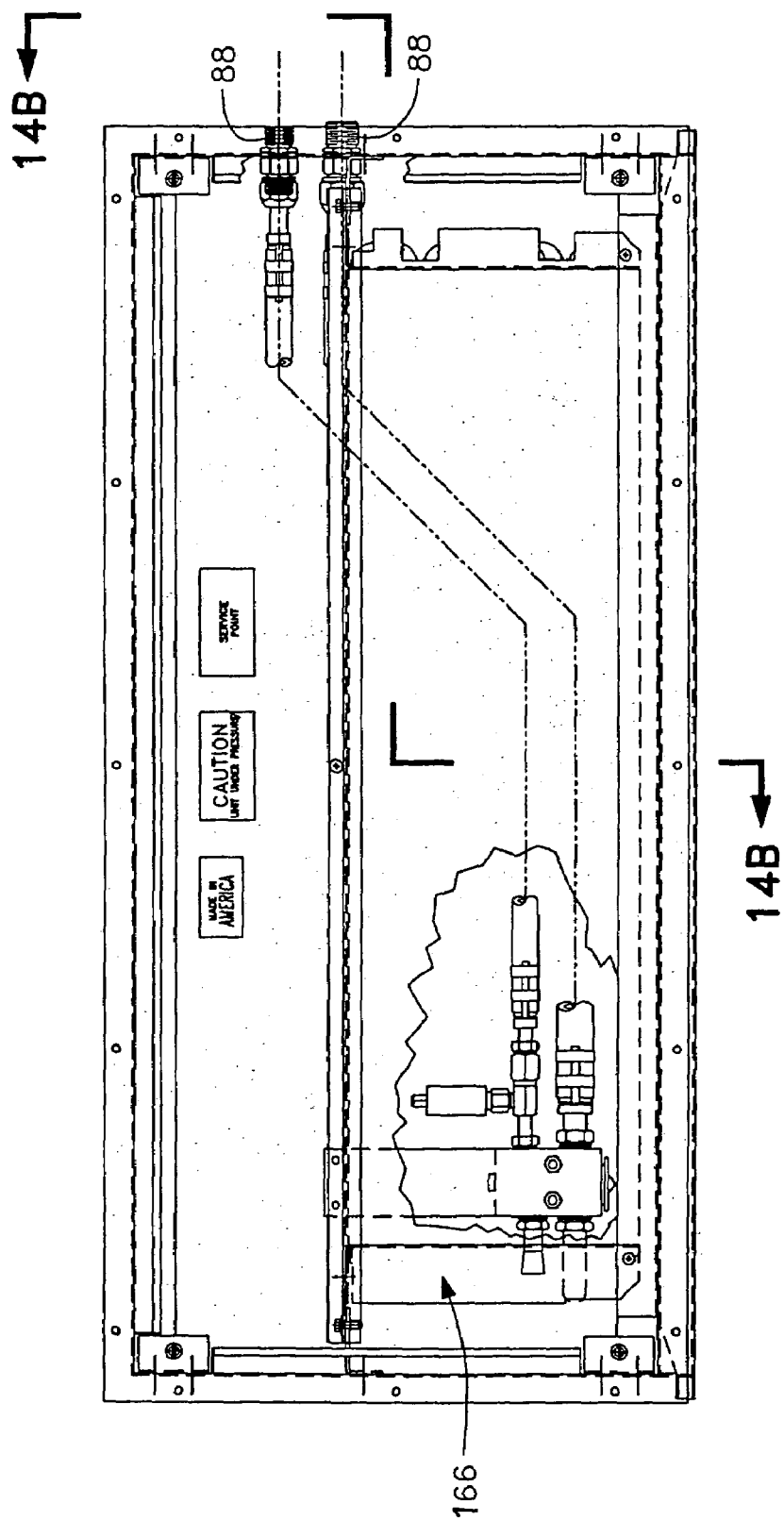

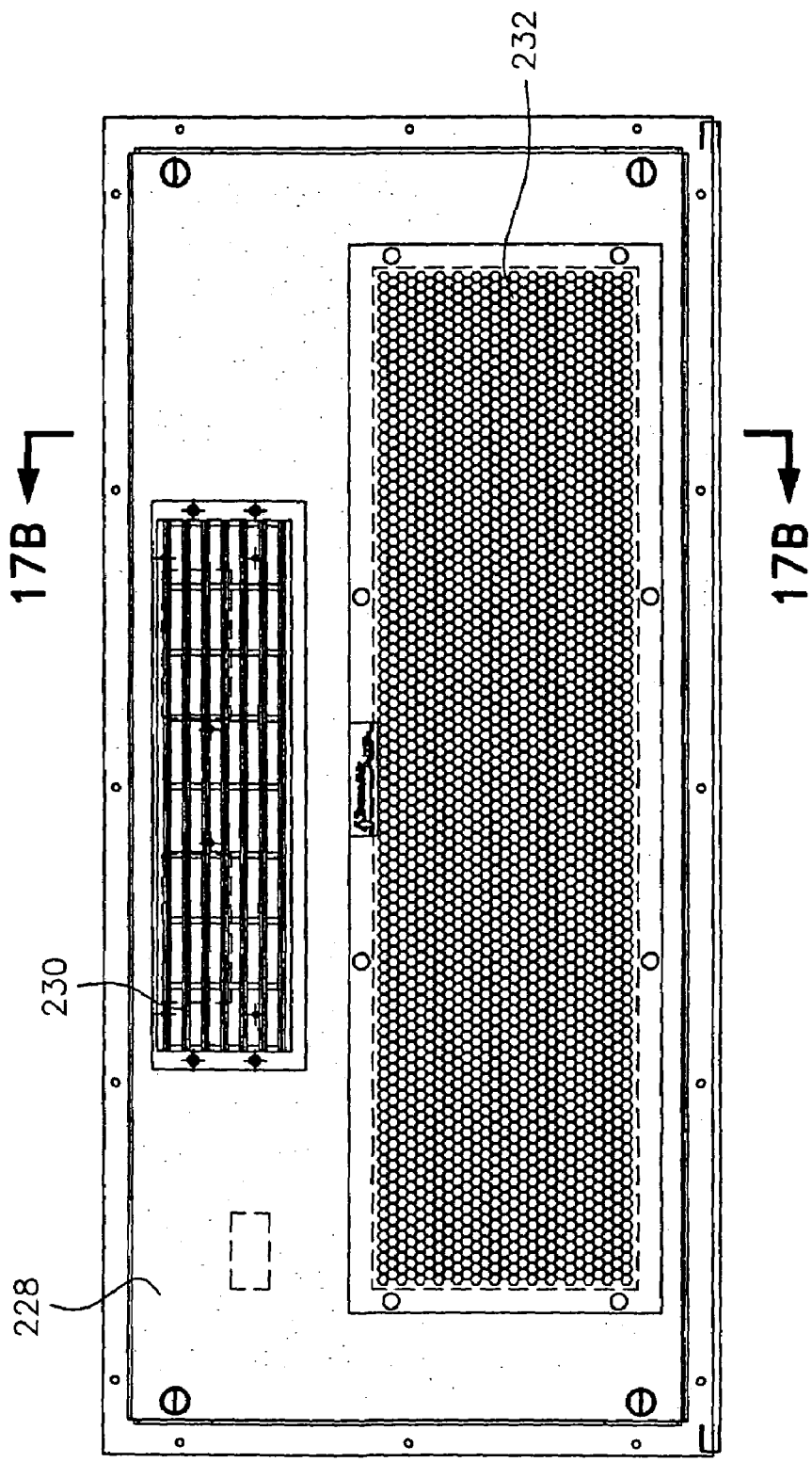

FIG. 17B
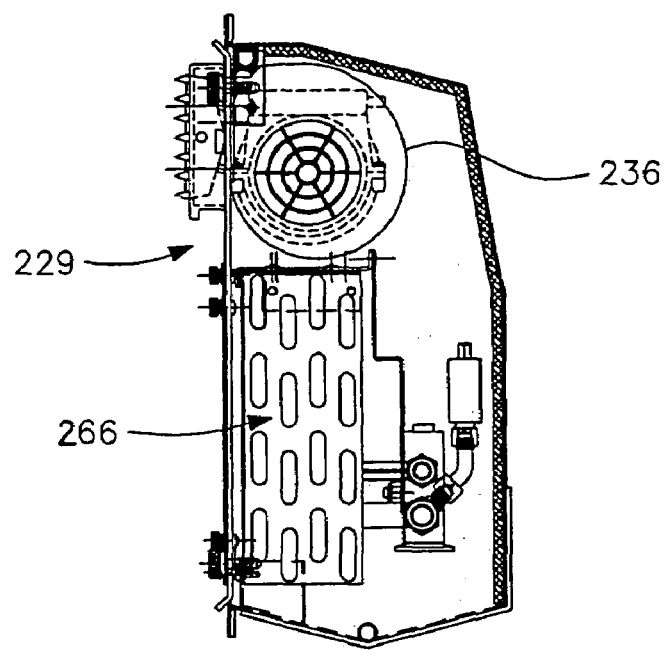
FIG. 18B
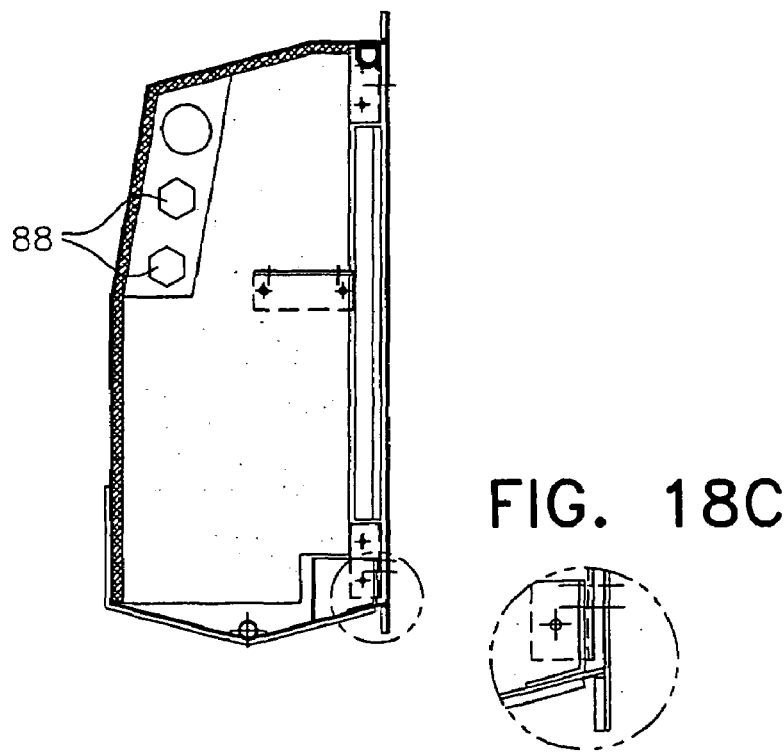
FIG. 18C

SELF-CONTAINED FLUSH-MOUNT BULKHEAD AIR CONDITIONING UNIT WITH NOVEL EVAPORATOR/BLOWER ASSEMBLY HOUSING

This application is entitled to and hereby claims the priority of now abandoned U.S. Provisional application Ser. No. 60/528,867 filed Dec. 12, 2003.

BACKGROUND OF THE INVENTION

1. Field of the Invention

This present invention generally relates to an air conditioning (AC) unit having an evaporator/blower housing adapted for mounting into the front or rear bulkhead of a bus or similar type vehicle for transporting a large number of occupants. More specifically, the invention relates to housings which are small, lightweight and easy to service and which allow evaporator/blower assemblies to be located distally from the compressor/condenser.

2. Description of the Related Art

Air conditioning units have been installed in various types of vehicles, with the design and operating parameters of the AC units adapted for installation in specific types of vehicles. Passenger buses presented particular problems due to the relatively large cooling load produced by the large number of passengers and the extensive window areas. Also, it is difficult to obtain effective air circulation through the large volume of internal space to be cooled. In prior art developments, passenger buses have been provided with AC units mounted on the roof or at other locations with the compressor assembly being driven from the engine which powers the bus. A condenser, condenser fan, evaporator and evaporator fan are associated with a compressor, expansion valve and other conventional components to provide a refrigeration system to supply conditioned air to the interior of the bus.

The following U.S. patents relate to the heating and cooling of a vehicle interior and the occupants therein: U.S. Pat. Nos. 4,201,064; 4,870,833; 5,428,967; 4,622,831; 4,926,655; 5,605,055; 4,727,728; 5,001,905; 5,609,037; 4,748,825; 5,184,474; 5,678,761; 4,787,210; 5,220,808; 6,295,826; and 6,494,052. These patents disclose various roof and rear mounted air conditioning and heating units for buses and other vehicles and are hereby expressly incorporated by reference in their entirety. However, the above listed patents do not disclose a self-contained AC unit which has an evaporator assembly separated and located distally from the compressor and condenser, allowing the evaporator assembly to take up much less space than a prior AC unit. As a result, the prior systems require a considerable amount of space, making them unsuitable for installation within the front or rear bulkhead of a bus or similar vehicle.

Further, one of the problems associated with installing evaporator components inside a vehicle has always been condensation. Water results from the hot humid interior air coming into contact with the cool evaporator surface, and drips onto the bottom of the unit housing where it must be drained away. Often the housing is made of multiple pieces of metal that are welded together. Constant exposure of the metal welds to the water causes corrosion and leakage into the interior of the bulkhead. Furthermore, operation of the AC unit while the bus is in motion can cause drainage problems for standard conventional drain pans, as the water sloshes laterally with the movement of the bus.

Accordingly, a need exists for a compact housing to contain an evaporator assembly that can be mounted in a front or rear bus bulkhead, remotely located from the associated compressor and condenser units. Also needed is a housing having a floor pan which is leak resistant and which facilitates drainage of condensate whether the vehicle is in motion or stationary in a non-level position, and which is shaped to allow for both ease of installation and access for service retrofit.

SUMMARY OF THE INVENTION

In view of the foregoing, the present invention is directed to a self-contained evaporator assembly that is small and lightweight, being designed to be flush mounted to a variety of bulkhead surfaces and particularly to the front or rear bulkhead of a bus or other similar type vehicle in an area above the prime mover of the vehicle which is usually vacant and available. The mounting of the evaporator assembly of the AC unit in this area of the bus enables installation without alteration of the roof or other external configuration of the bus.

According to the present invention, the evaporator assembly includes a coil subassembly, a blower panel subassembly and a generally rectangular housing having a front opening for receiving the coil and blower panel subassemblies therein. The housing has a floor pan with two sloping surfaces that meet to form an inverted apex. In the lateral walls of the housing adjacent each end of the inverted apex is a drain aperture through which condensate from the evaporator can flow to exit the housing. The housing is preferably made from a single piece of metal to reduce corrosion susceptibility, and at least part of the upper surface of the housing is chamfered to facilitate easy installation thereof within a bulkhead opening.

The evaporator housing of the present invention can accommodate a blower panel subassembly equipped with either single or dual evaporator blowers for increased airflow into the passenger compartment, and a plurality of compact coil designs for a variety of installation openings. The evaporator assembly may be used with single or dual compressors and a single skirt-mounted condenser.

It is therefore an object of the present invention to provide a small compact self-contained evaporator assembly, the housing of which can fit into a bulkhead of a bus or similar vehicle.

It is a further object of the present invention to provide a small compact evaporator assembly housing that can be made from a single piece of aluminum or other material.

It is a still further object of the present invention to provide a compact housing for coil and blower subassemblies that is made from two pieces of aluminum or other material.

It is another object of the present invention to provide an evaporator assembly housing that has chamfered top lateral surfaces so as to provide additional clearance with a bulkhead during installation.

It is yet another object of the present invention to provide an evaporator assembly housing having a floor pan with sloping surfaces to facilitate drainage of condensate from the unit.

It is still a further object of the present invention to provide an evaporator assembly housing having a floor pan with two sloping surfaces that meet to form an inverted apex with drain apertures on both lateral sides adjacent the apex to allow drainage of condensate from the unit when the vehicle is in motion or when it is stationary in a non-level position.

It is also an object of the present invention to provide an evaporator assembly housing capable of being fitted with either single or dual blower units.

It is yet a further object of the present invention to provide an evaporator assembly housing which provides openings on either lateral side to allow for connection to separate, distally located, compressor and condenser units.

It is another object of the present invention to provide an evaporator assembly housing having a chamfered upper surface adjacent a rearside to facilitate bulkhead installation.

Yet another object of this present invention to be specifically enumerated herein is to provide an evaporator assembly in accordance with the preceding objects and which will conform to conventional forms of manufacture, be of simple construction and be easy to use so as to provide an assembly and housing that will be economically feasible, long lasting and relatively trouble free in operation.

These together with other objects and advantages which will become subsequently apparent reside in the details of construction and operation as more fully hereinafter described, reference being had to the accompanying drawings forming a part hereof which illustrate the evaporator/blower assembly and housing of the present invention and their various components and related structure. The drawings are intended to illustrate the present invention and are not necessarily to scale.

BRIEF DESCRIPTION OF THE DRAWINGS

FIG. 1B is a schematic view of a bus roof and bulkhead area and the shape of the cutout needed for installation of the housing of FIG. 1A.

FIG. 3A is a front elevational view of a blower panel subassembly for installation in the housing of FIG. 1A according to the present invention.

FIG. 3B is a rear elevational view of the air inlet grille of the blower panel subassembly of FIG. 3A.

FIG. 5A is a front elevational view of the housing of FIG. 1A with foam tape installed and the face plate removed.

FIG. 6A is a front elevational view of the coil subassembly for installation in the housing of FIG. 1A.

FIG. 6B is a rear elevational view of the coil subassembly of FIG. 6A.

FIG. 7A is a front elevational view of the housing of FIG. 5A showing the coil subassembly installed therein.

FIG. 8A is a front elevational view of the housing of FIG. 1A with the blower panel and coil subassemblies installed.

FIG. 10A is a side elevational view of the second housing embodiment of FIG. 9A.

FIG. 10B is another side elevational view of the second embodiment of FIG. 9A further showing the location of additional openings for hose connections to the compressor and condenser units.

FIG. 10C is an enlarged view of the circled detail of FIG. 10B.

FIG. 11A is a front elevational view of a blower panel subassembly for the housing of FIG. 9A, the subassembly having a face plate, an air inlet grille and dual blowers with blower louvers.

FIG. 11B is a rear elevational view of the air inlet grille of FIG. 11A.

FIG. 14A is a front elevational view of the housing according to the second embodiment of FIG. 9A with the blower panel subassembly removed to show the coil subassembly installed in the housing for a dual blower unit.

FIG. 17A is a front elevational view of the blower panel subassembly of FIG. 15A mounted in the housing according to the alternate embodiment.

FIG. 17B is a cross-sectional view taken along line 17B—17B of FIG. 17A showing the single blower and coil subassemblies.

FIG. 18B is a cross-sectional view taken along line 18B—18B of FIG. 18A.

FIG. 18C is an enlarged view of the circled detail of FIG. 18B.

DETAILED DESCRIPTION OF THE PREFERRED EMBODIMENTS

Figure 1A:
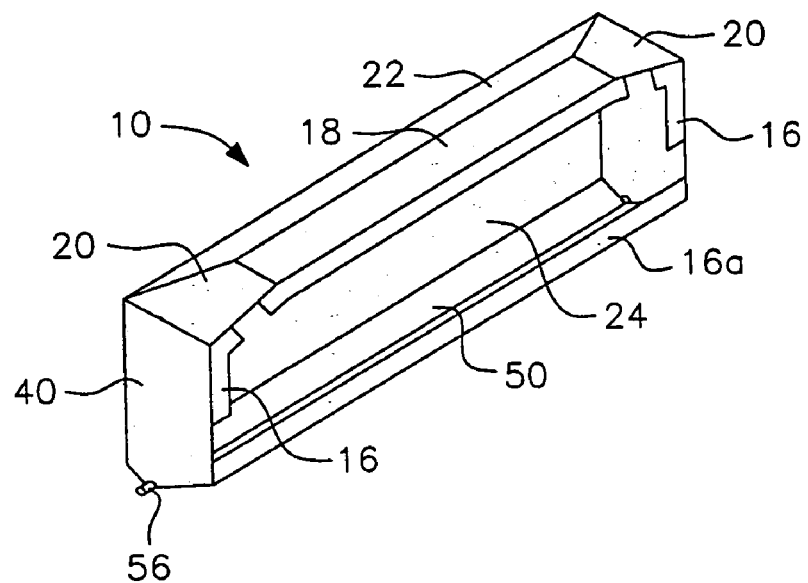
FIG. 1A is a schematic perspective view of an evaporator assembly housing according to the present invention.

Although only a few preferred embodiments of the present invention are explained in detail, it is to be understood that these embodiments are given by way of illustration only. It is not intended that the invention be limited in its scope to the specific details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

The present invention is directed to a self-contained evaporator assembly, generally designated by the reference numeral 5 (see FIG. 8B), which includes a housing for an air conditioning system to be used within a bus or similar vehicle. The evaporator assembly includes a coil subassembly, generally designated by the reference numeral 66 (see FIG. 6A), and a blower panel subassembly, generally designated by the reference numeral 29 (see FIG. 3C).

One embodiment for the housing is illustrated in FIG. 1A and generally designated by the reference numeral 10. As used herein, references to a "bus" are intended to include various types of buses as well as other vehicles within which air conditioning systems are or may be installed.

The housing 10 with the coil subassembly 66 and blower panel subassembly 29 contained therein is preferably mounted below the roof line and above the passenger space in the overhang area or bulkhead 12 of the bus, as shown in FIG. 1B. The shape of the housing 10 is suited to fit a cutout 14 in the bulkhead 12.

Figure 2A:
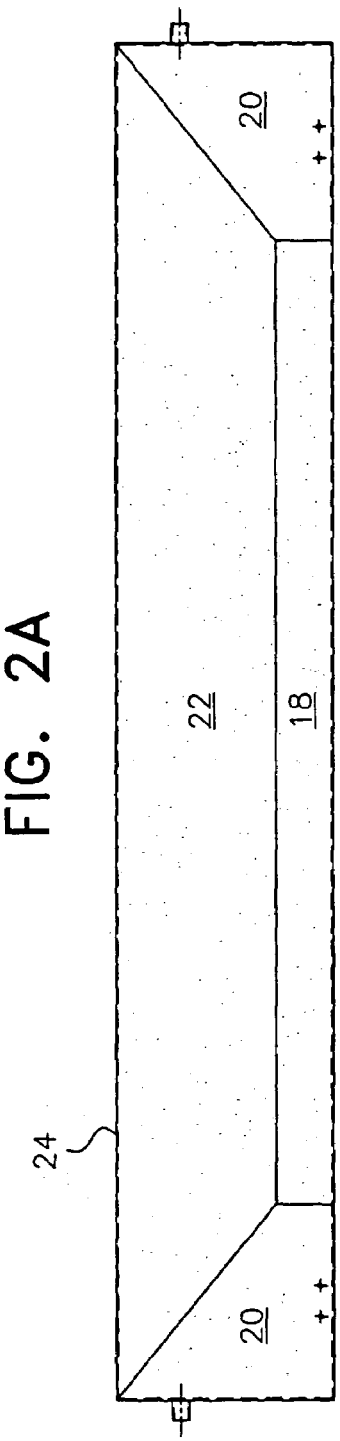
FIG. 2A is a top elevational view of the housing of FIG. 1A showing the lateral and rear chamfering of the upper surface of the housing.
Figure 2B:
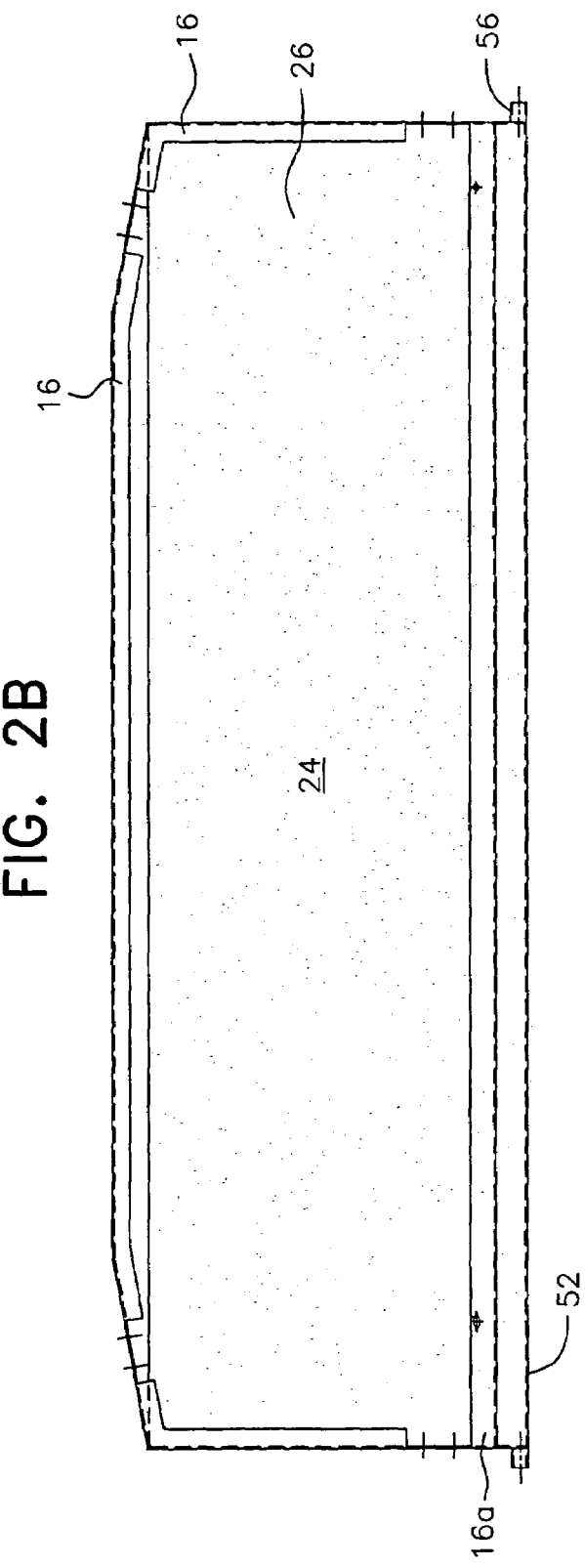
FIG. 2B is a front elevational view of the housing of FIG. 1A showing the front opening where the coil and blower panel subassemblies are installed.

According to the embodiment shown in FIG. 1A, the housing is generally rectangular in shape and is made of a single piece of aluminum folded to form inwardly directed flanges 16. As shown in greater detail in FIG. 2A, the top wall 18 of the housing 10 is chamfered along two axes, being beveled on two lateral side surfaces 20 as well as along a rear surface 22 so as to decline toward the rear wall 24 of the housing. The chamfered surfaces 20 and 22 facilitate mounting of the housing 10 within the relatively tight confines of the bulkhead cutout 14. The front opening 26 of the housing, as shown in FIG. 2B, is of sufficient size to provide for ease of installation of the coil subassembly through such opening 26.

The housing 10 is fitted with a removable face plate 28 which, as shown in FIG. 3A, supports at least one blower louver 30 and an air inlet grille 32, the latter shown from the back side in FIG. 3B. Preferably, damping material is applied to the back surfaces 34 of the edges around the grille 32 which is then secured to the face plate 28. Alternately, the grille 32 may be integrally formed with the face plate 28 as a single unit.

Figure 3C:
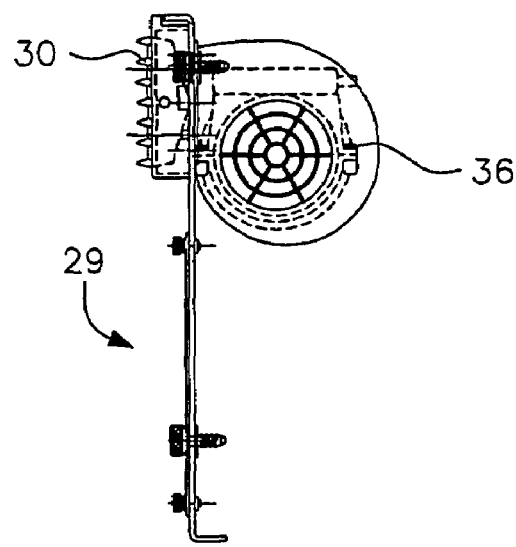
FIG. 3C is a side elevational view of the blower panel subassembly of FIG. 3A.

As shown and described herein, the air inlet grille 32 serves to allow incoming air to pass through the coil subassembly 66 contained within the housing 10 while dual mounted blower louvers 30 are set adjacent to one another for venting of conditioned air back into the passenger compartment of the bus. The venting of conditioned air is effected by at least one blower unit 36 mounted to the face plate 28 behind the blower louvers 30. The face plate 28, louvers 30, air inlet grille 32 and blower unit 36 together form the blower panel subassembly 29, as shown in FIG. 3C.

Figure 3D:
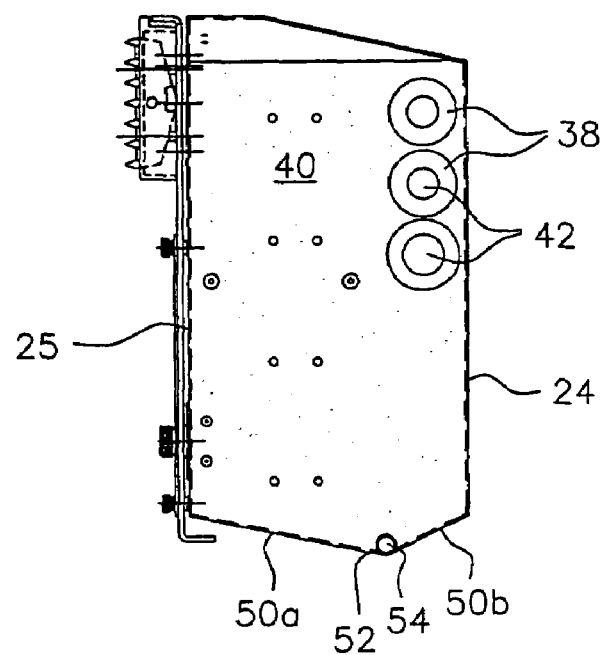
FIG. 3D is a side elevational view of the housing of FIG. 1A with the blower panel subassembly installed, showing the chamfered top corners and upper surface, as well as the base of the unit having sloped surfaces meeting in an inverted apex with drain openings at each lateral end.

As illustrated in FIG. 3D, according to the preferred embodiment, a plurality holes or apertures 38 are punched into either or both lateral walls 40 of the housing 10 in the upper half thereof. These holes are positioned adjacent the rear wall 24 of the housing, but they may be in other configurations depending on the particular evaporator assembly configuration. The holes 38 allow the passage of wiring elements to make electrical connections to the blower unit 36, as well as passage of piping or hoses 42 in order to make fluid connections between the coil subassembly 66 and the compressor and condenser units located elsewhere in or on the vehicle (not shown).

As shown in FIGS. 1A and 3D, the floor pan 50 of the housing 10 is not flat but rather is designed to facilitate draining, having two sloping surfaces 50a, 50b that meet to form an inverted apex 52. At each lateral wall 40 of the housing, adjacent to the floor pan 50 and positioned at the inverted apex 52, a drain aperture 54 is provided for passage of condensate draining into the floor pan. According to the preferred embodiment shown, a drain tube 56 is coupled to each drain aperture 54 for connection of a drain hose or pipe (not shown). The front lip 16a of the floor pan 50 is integral therewith in this embodiment.

The sloped surfaces 50a, 50b of the floor pan 50 cause water collecting from condensation in the evaporator assembly 5 to travel to the bottom of the inverted apex 52 and exit through the drain apertures 54 and tubes 56. Having drain apertures 54 on both lateral side walls 40 ensures that proper drainage is provided even when the vehicle is in motion, making a turn, or in a non-level orientation such as on the slope of a hill, allowing inertia to assist in fluid drainage during vehicle operation.

In the preferred embodiment shown, the inverted apex 52 where the sloped bottom surfaces 50a, 50b meet is positioned so as to be closer to the rear wall 24 of the housing 10 than to the front 25 thereof. The drain tubes 56 are preferably constructed from aluminum tubing and are welded to the lateral walls 40 of the housing 10.

Figure 4B:
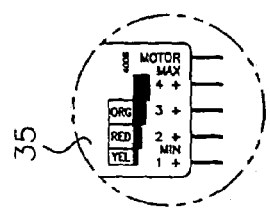
FIG. 4B is an enlarged view of the circled detail of FIG. 4A.
Figure 4A:
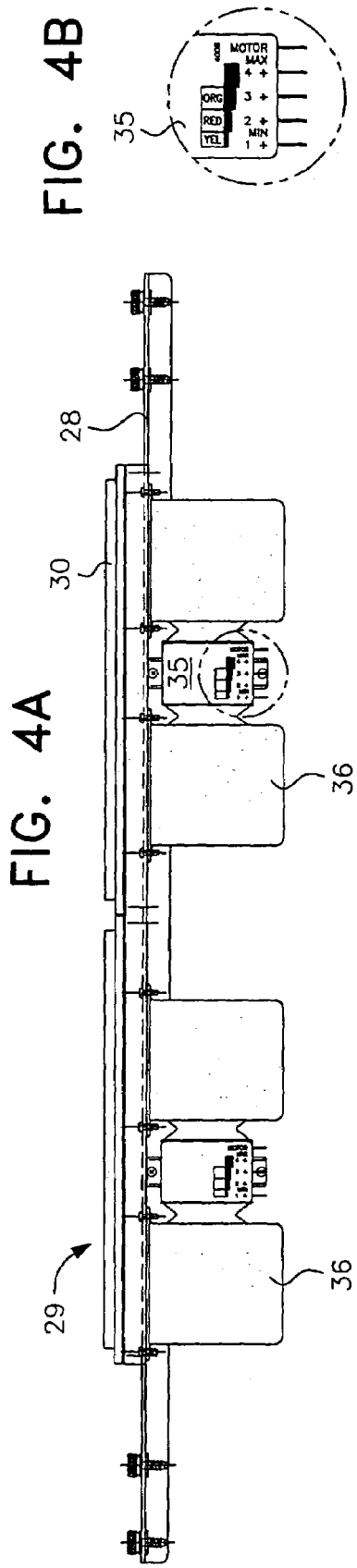
FIG. 4A is a top elevational view of the blower panel subassembly with dual blowers of FIG. 3A.
Figure 4C:
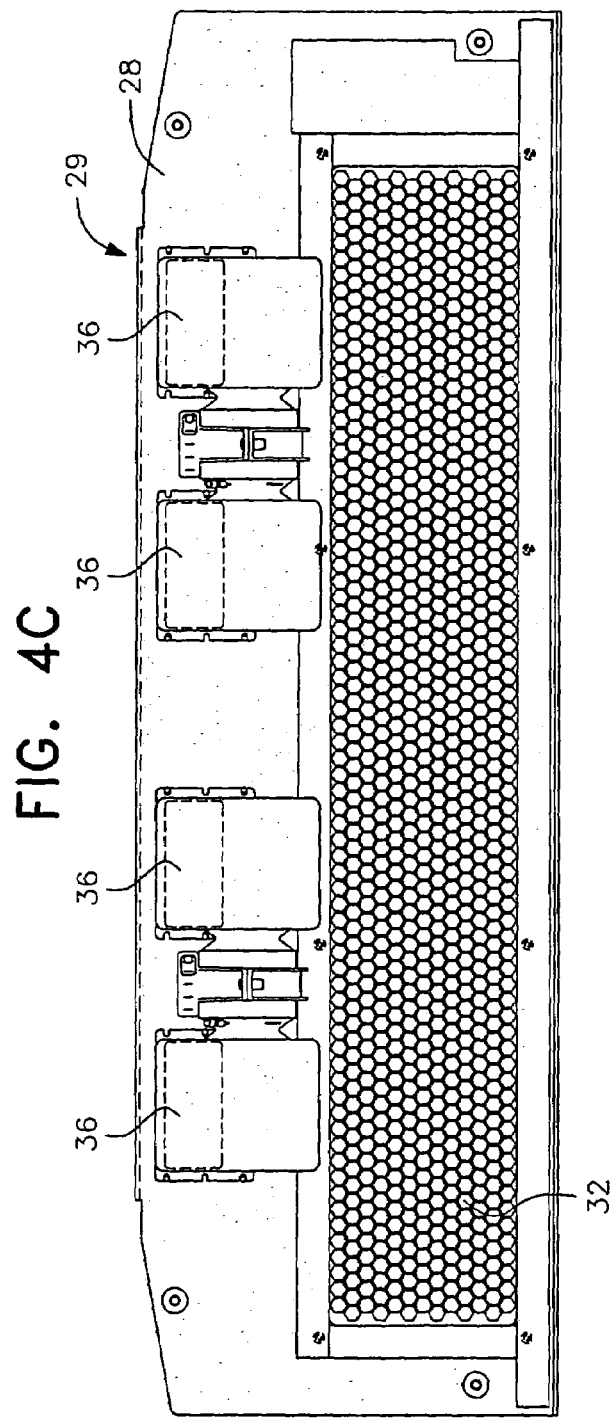
FIG. 4C is a rear elevational view of the blower panel subassembly with dual blowers of FIG. 4A.

FIGS. 4A, 4B and 4C illustrate the face plate 28 with dual blower units 36 mounted therein forming the blower panel subassembly 29. Specifically, the side-by-side arrangement of the two blower units 36 as affixed to the face plate 28 and aligned behind blower louvers 30 is shown in the top view of FIG. 4A, with the spatial arrangement of these blower units relative to the air inlet grille 32 being shown in the rear view of FIG. 4C. The blower panel subassembly 29 is removed as a unit when the fasteners holding the face plate 28 to the housing 10 are released, allowing access to the coil subassembly 66 mounted within the housing 10.

The number and size of the blower units 36 is limited primarily by the space available within the housing 10. The fans within the blower units are driven in a conventional manner by centrally located electric motors 35 which, being operated using conventional controls, circulate air from the air inlet grille 32 through the coil subassembly 66 and then expel the chilled air through the blower louvers 30 into the passenger compartment. A more detailed view of the motor 35 is shown in FIG. 4B.

Figure 5B:
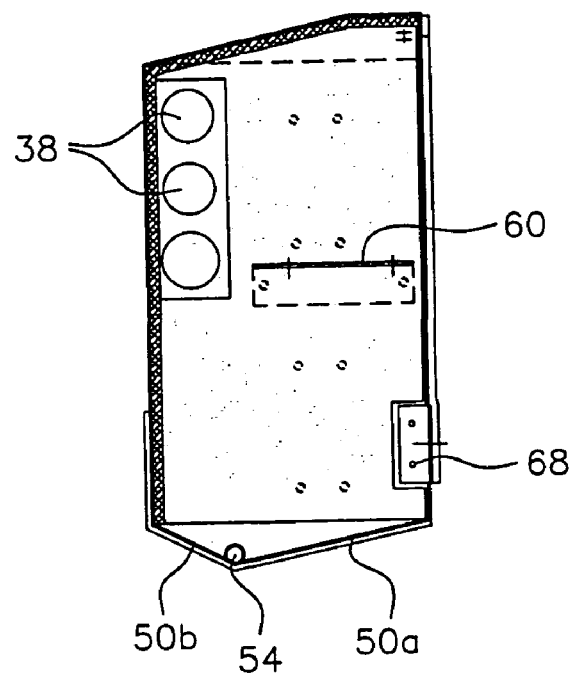
FIG. 5B is a cross-sectional view taken along line 5B—5B of FIG. 5A, depicting the hose apertures in the lateral wall.

Other views of the housing with the face plate 28 removed are provided in FIGS. 5A and 5B. According to the preferred embodiment shown, foam tape 58 is affixed to the front surfaces of the housing for providing a snug, insulated interface with the face plate 28. The face plate is secured to the housing with brackets 68. A shelf bracket 60 on each lateral wall 40 is used to secure the coil subassembly 66 within the housing 10. FIG. 5B also depicts the hose apertures 38 for fluid connection to the coil subassembly 66 and electrical connection to the blower panel subassembly 29.

The housing 10 is mounted within the bulkhead preferably by angle brackets (not shown), which are fastened to the outside surfaces of the housing and then are attached to internal structural members as may be available within the bulkhead. This readily modified mounting configuration allows the present invention to be installed more easily than conventional units, especially in retrofit applications, due to the adaptability in the angle bracket location permitted by the mounting thereof external to the housing, as well as by the use of hose connections between the evaporator assembly and the compressor and condenser units which allow for distal location of these latter units. The housing may also be affixed to the bulkhead using other various connecting elements as would be known by persons of ordinary skill in the art.

Figure 7B:
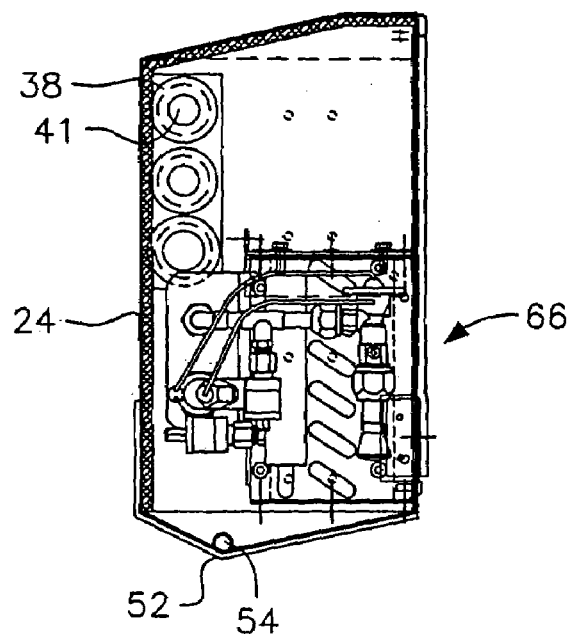
FIG. 7B is a cross-sectional view taken along line 7B—7B of FIG. 7A, showing the installed coil subassembly and hose grommets.

Fitted within the housing adjacent the air inlet grille 32 is the coil subassembly 66, as variously shown in FIGS. 6A, 6B, 7A and 7B. The coil subassembly 66 includes a conventional rectangular coiled tube and fin heat exchanger, each of which includes end walls. In addition to the shelf bracket 60 upon which the coil shelf 65 is secured, the coil subassembly 66 is supported from the lateral walls 40 of the housing by attachment to the front lip 16a of the floor pan 50 as at hole 70. The coil fins are located behind the air inlet grille 32 for effective heat exchange with incoming air. When the blower panel subassembly 29 is removed, the coil subassembly may be accessed as shown in FIG. 7A.

Figure 8B:
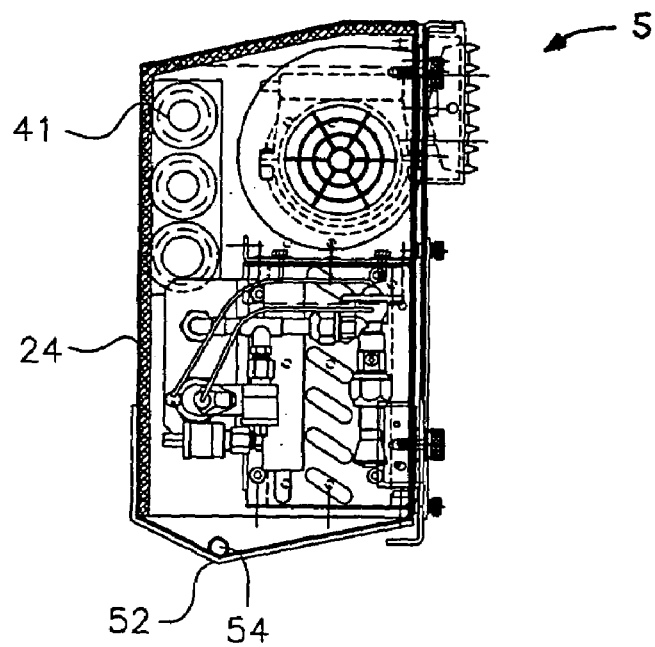
FIG. 8B is a cross-sectional view taken along line 8B—8B of FIG. 8A showing the blower panel subassembly, the coil subassembly and hose grommets installed in the housing.
Figure 9A:
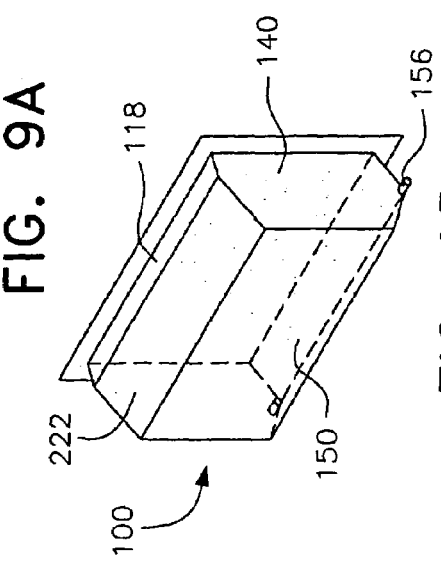
FIG. 9A is a schematic rear perspective view of a second embodiment contemplated for an evaporator assembly housing according to the present invention, showing the chamfered upper surface and the sloped surfaces of the floor pan of the unit meeting in an inverted apex with drain openings at each lateral end.
Figure 9B:
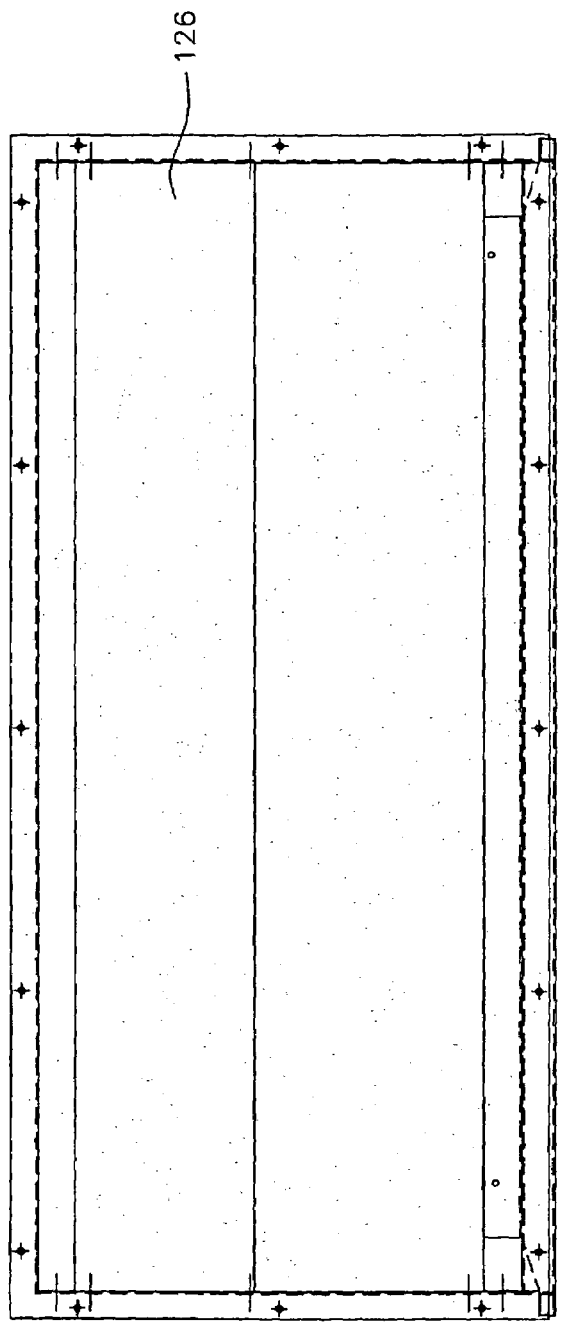
FIG. 9B is a front elevational view of the second embodiment of FIG. 9A with the face plate removed showing the front opening where the blower panel and coil subassemblies are installed.

The housing 10 with the blower panel subassembly 29 and coil subassembly 66 installed is shown in the front and sectional views of FIGS. 8A and 8B, respectively. In the preferred embodiment shown in FIG. 8A, the face plate 28 is affixed to the housing by the brackets 68 with fasteners 71, such as captive screws or the like. The blower panel subassembly 29 may be removed as a unit when service is needed, leaving the coil subassembly 66 secured within the housing 10 as shown in FIG. 7B. In addition to showing the arrangement of all the components within the housing, FIG. 8B also shows the hose apertures 38 in the lateral walls 40 with hose grommets 41 to protect hoses passing therethrough for connection to the remotely located compressor and condenser units (not shown).

In order to reduce the size of the housing, the compressor and condenser assembly units are distally located relative to the evaporator assembly. Connection between the coil subassembly and the compressor and condenser units is effected by hose lines 42 or other coupling components that can enter the evaporator assembly housing 10 from either lateral wall 40 thereof depending on the particular installation. In the case of a preferred installation in a school bus, for instance, the evaporator assembly housing 10 is flush mounted in the front bulkhead of the bus so that, with the compressor unit being positioned in the front engine compartment, the hose connections are shortened; conversely, in a commercial bus embodiment in which the compressor assembly is located with the engine at the rear of the bus, the evaporator assembly within the housing is flush mounted in the rear bulkhead. The condenser is typically located on the side of the bus or on the roof.

A second preferred embodiment of a housing, generally designated by the reference numeral 100, for use with the self-contained evaporator assembly in accordance with the present invention is shown in FIGS. 9A, 9B, 10A, 10B, 10C, 10D and 10E. As with the first embodiment, the housing 100 is generally rectangular in shape. However, unlike the first embodiment, the top wall 118 of the housing is chamfered along only one axis, being beveled at a rear surface 122 at a declining angle toward the rear wall 124 of the housing. In addition, the inverted apex 152 formed by the two sloped surfaces 150a, 150b of the floor pan 150 is generally in the middle of the floor pan 150, rather than being offset toward the rear wall 124. However, as with the first embodiment, the dual drain apertures 154 provide for drainage regardless of the vehicle's orientation, e.g., even when the vehicle is angled laterally. The drain apertures 154, as before, are preferably coupled to drain tubes 156 constructed from aluminum tubing and welded to the lateral walls 140 of the housing 100.

Figure 10D:
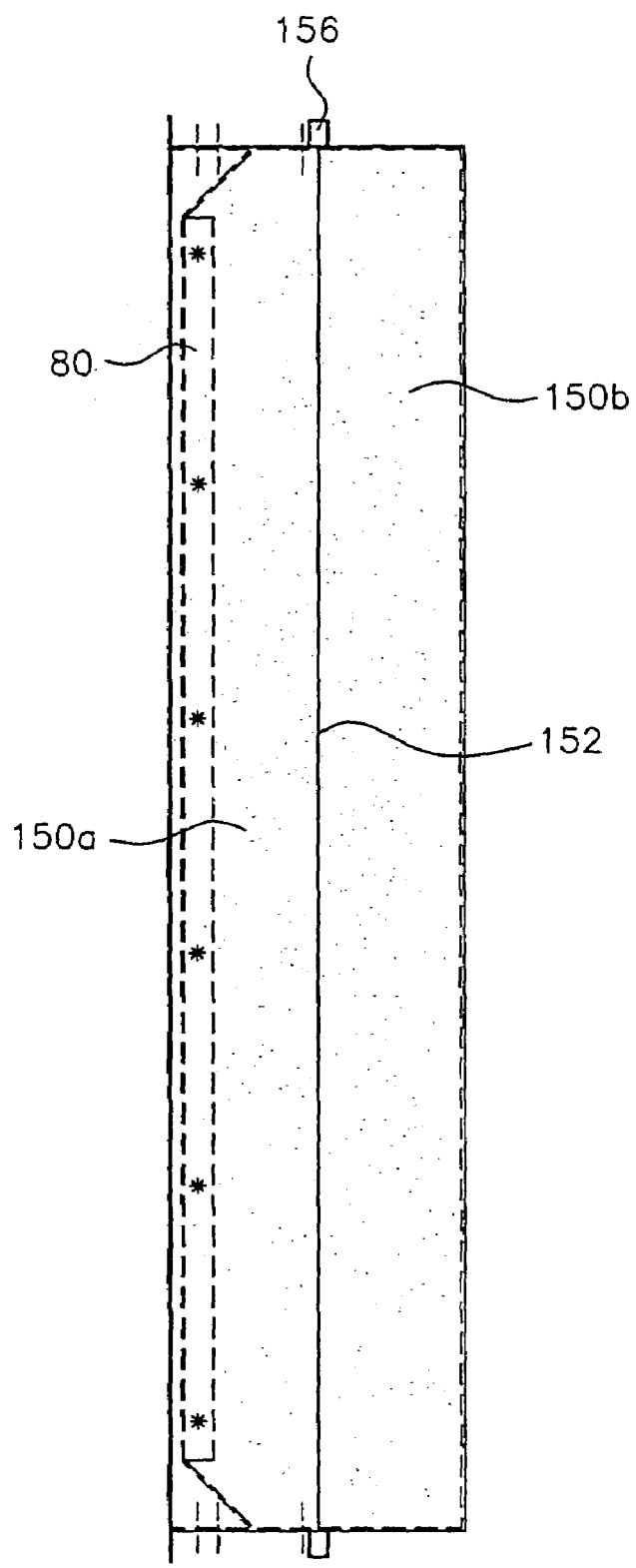
FIG. 10D is a bottom elevational view taken along line 10D—10D of FIG. 10B showing the bottom of the floor pan with sloped surfaces and location of the drain openings.
Figure 10E:
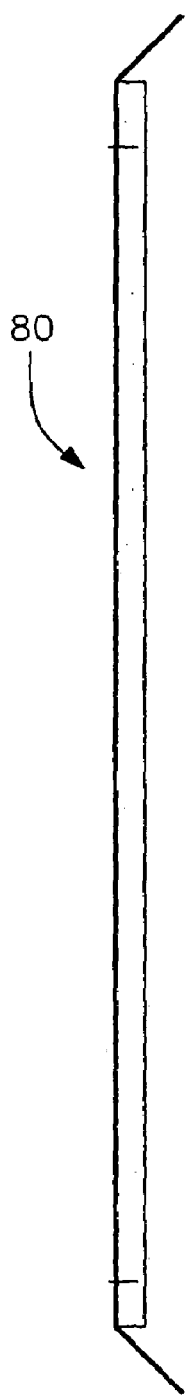
FIG. 10E is a detailed front elevational view of the front lip of the second housing embodiment of FIG. 10D.

According to the second embodiment, the housing 100 is made with two pieces of aluminum, the first piece 101 forming the housing enclosure itself while the second piece forms a front lip 80, shown in FIG. 10E, which is welded to the front opening 126 to act as a dam to prevent condensate from spilling out of the front opening 126 of the housing. The joints between the interfacing walls of the housing and the second piece of metal 80 are sealed by welding or other suitable means. Whether the housing is made of one or two metal pieces, aluminum is preferred, but other metals or materials may also be used.

Figure 12A:
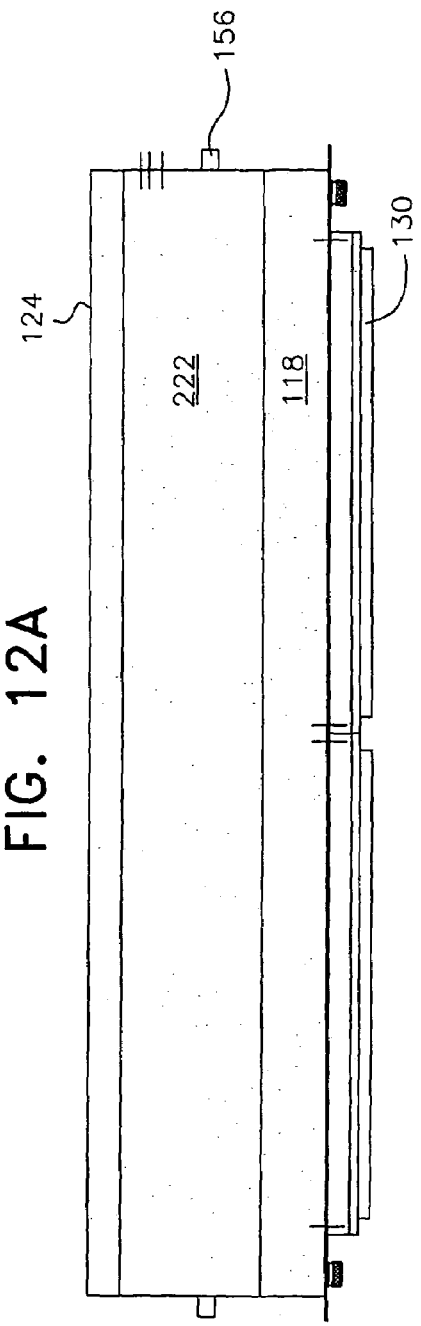
FIG. 12A is a top elevational view of the housing according to the second embodiment of FIG. 9A.
Figure 12B:
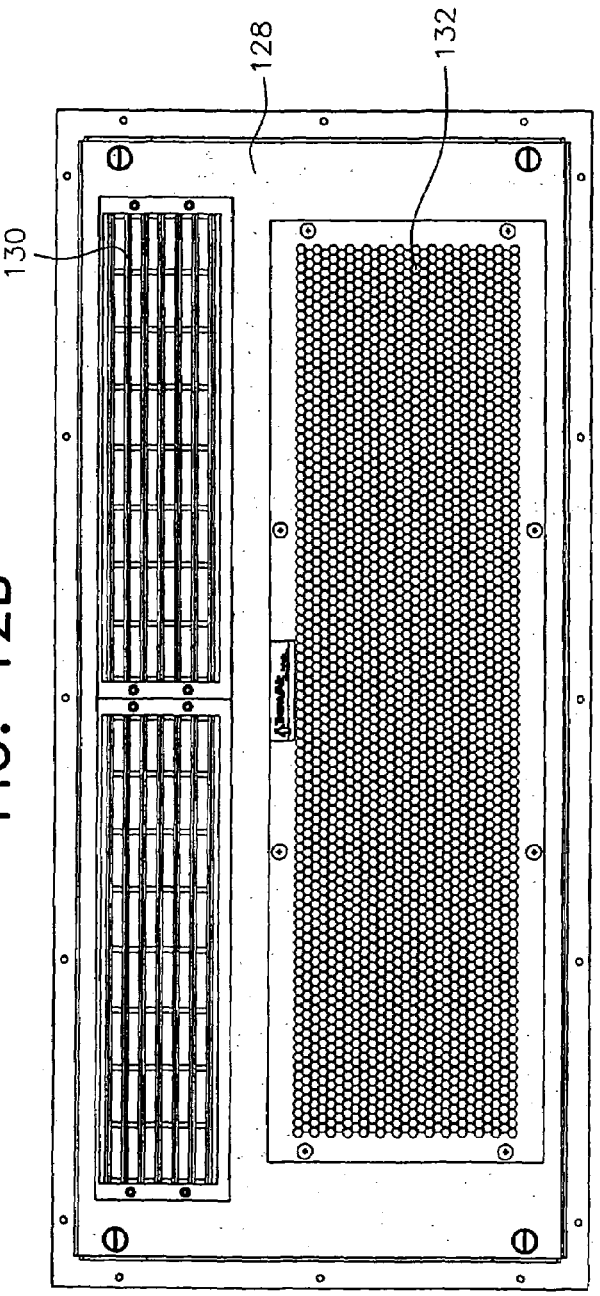
FIG. 12B is a front elevational view of the blower panel subassembly of FIG. 11A mounted in the housing according to the second embodiment of FIG. 9B.
Figure 12C:
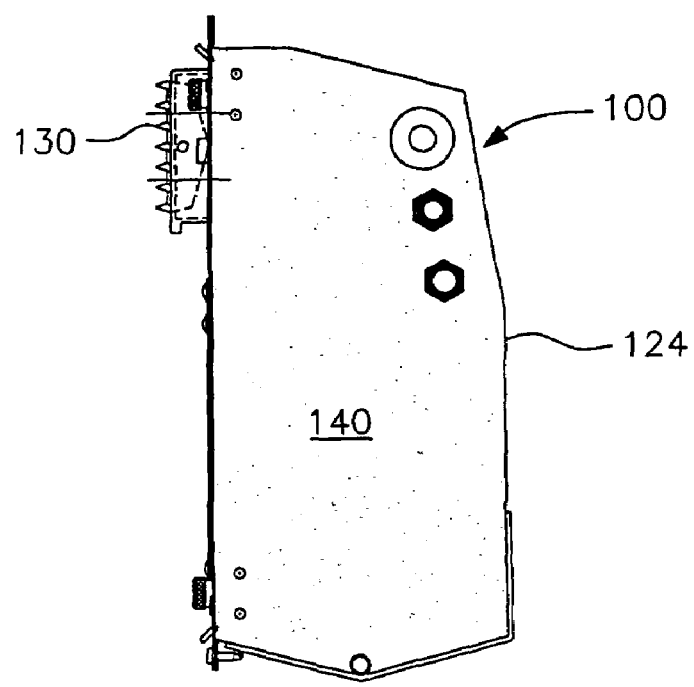
FIG. 12C is a side elevational view of the housing with blower panel subassembly of FIG. 12B.
Figure 12D:
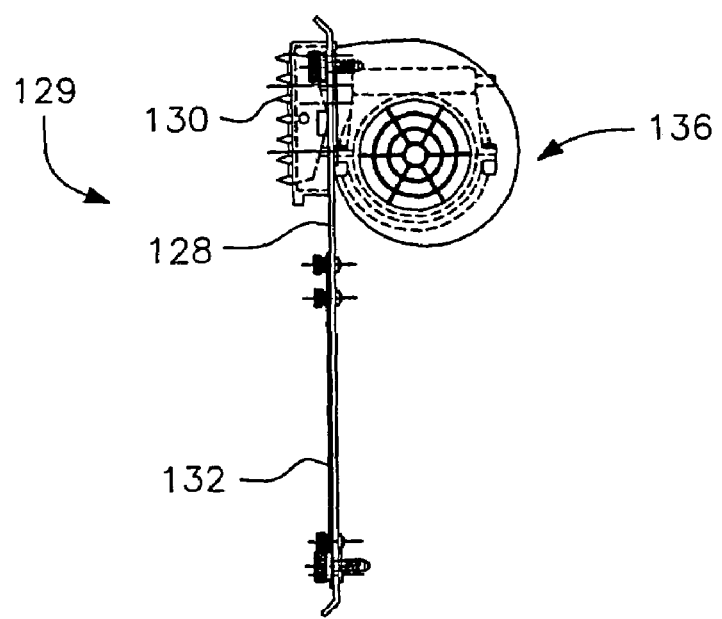
FIG. 12D is a side view of the blower panel subassembly of FIG. 12C, removed from the housing.
Figure 13B:
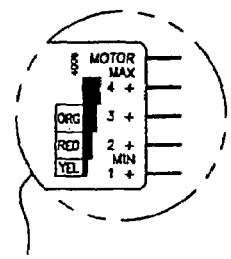
FIG. 13B is an enlarged view of the circled detail of FIG. 13A.
Figure 13A:
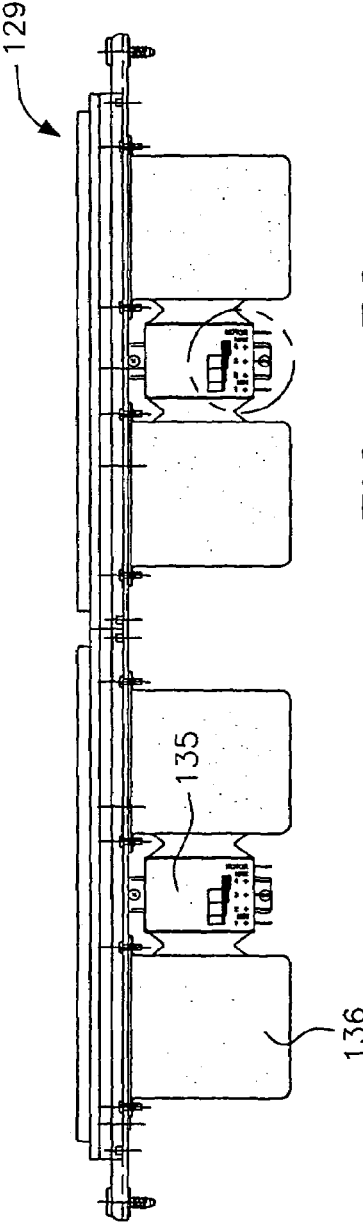
FIG. 13A is a top elevational view of a blower panel subassembly having a face plate with different overall dimensions but suited for use with the housing according to the second embodiment of FIG. 9A, showing two blowers attached thereto.
Figure 13C:
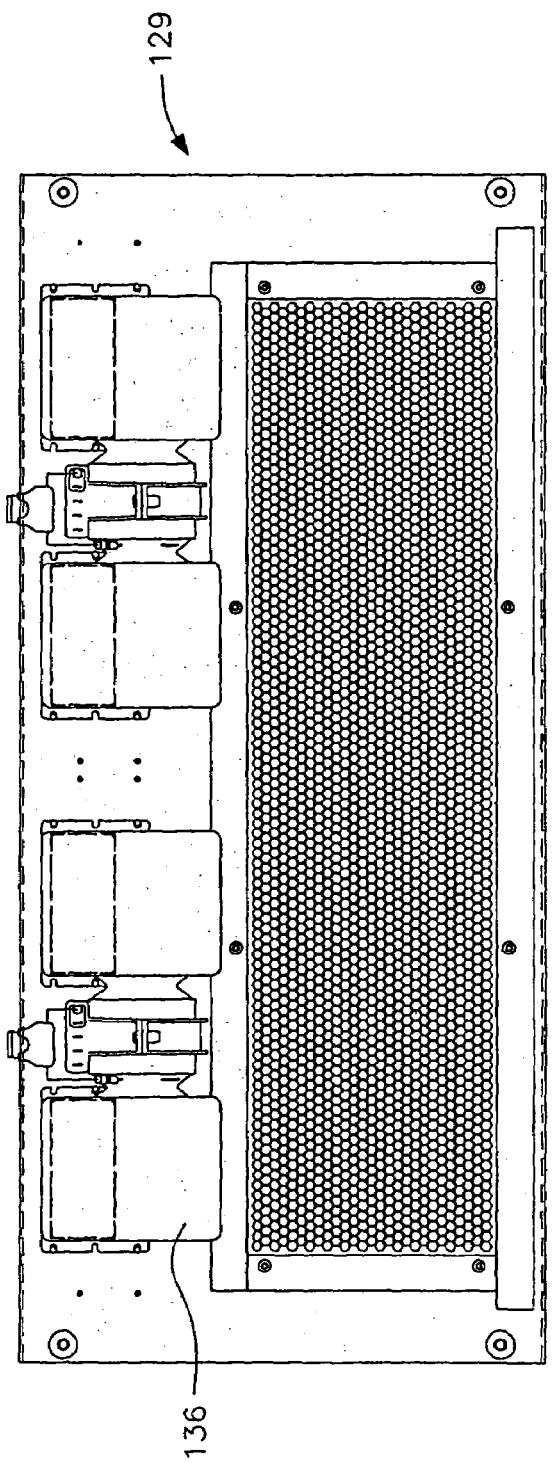
FIG. 13C is a rear elevational view of the blower panel subassembly of FIG. 13A.

A face plate 128 with dual blower louvers 130 and air inlet grille 132 suitable for use with the second embodiment of the housing 100 is shown in FIGS. 11A and 11B, and as installed in such housing in FIGS. 12A and 12B. One of the blower units 136 mounted to the face plate 128 and mounted within the housing 100 is shown in profile in FIG. 12C, with FIG. 12D depicting the blower unit 136 coupled to the face plate 128 to form the blower panel subassembly, generally designated by the reference numeral 129. Top and rear views of the blower panel subassembly 129 including the dual blower units with motors 135 mounted to the face plate 128 are provided in FIGS. 13A and 13C, respectively; a more detailed view of the motor 135 is provided in FIG. 13B.

Figure 14B:
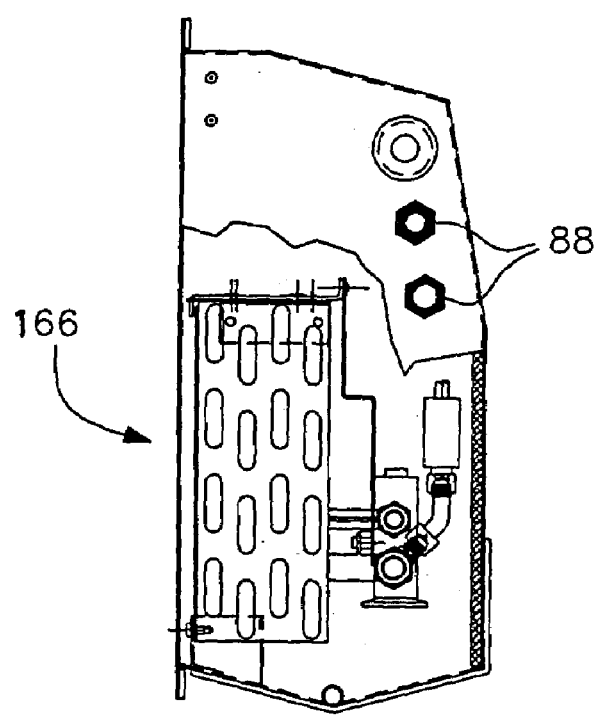
FIG. 14B is a cross-sectional view taken along the line 14B—14B of FIG. 14A.
Figure 15A:
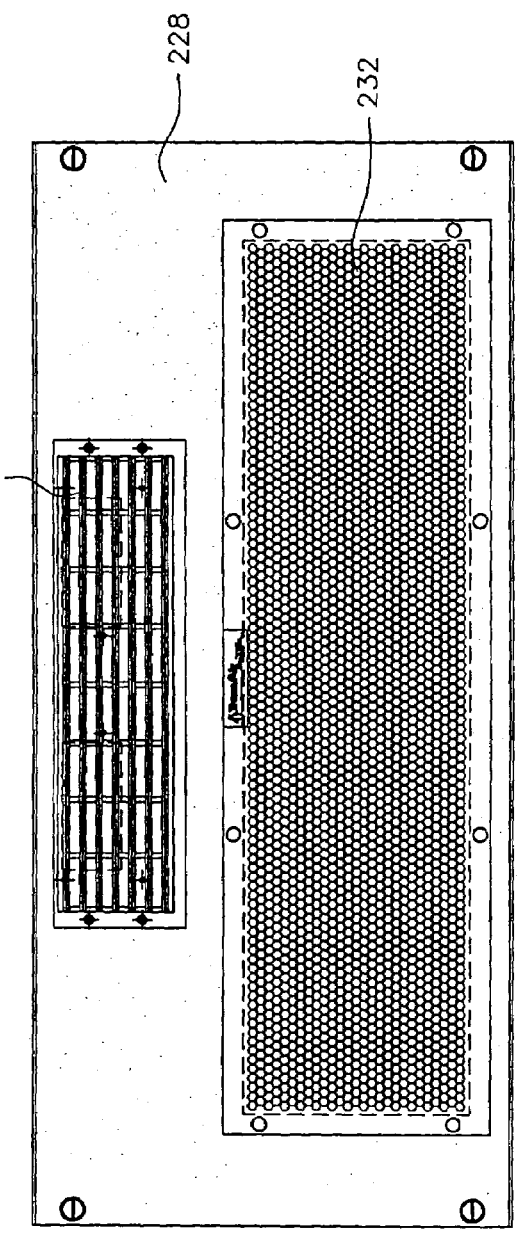
FIG. 15A is a front elevational view of an alternate embodiment contemplated for a blower panel subassembly of the evaporator assembly with housing according to the present invention, showing the face plate with air inlet grille and louvers for a single blower.
Figure 15B:
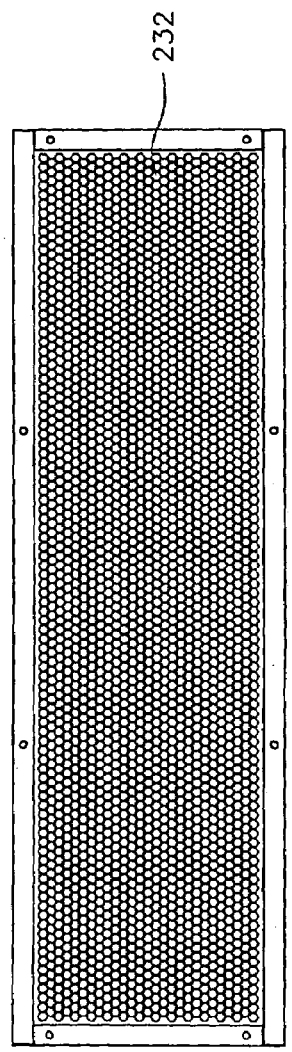
FIG. 15B is a rear elevational view of the air inlet grille of FIG. 15A.

FIGS. 14A and 14B depict the coil subassembly 166 mounted within the second embodiment of the housing 100 after the blower panel subassembly 129 has been removed. As shown, the housing may be provided with bulkhead fittings 88 instead of hose connection elements for connection to the compressor and/or condenser, an option that allows the present invention to accommodate various vehicle mounting arrangements.

An alternate face plate 228 embodiment for use with the second embodiment of the housing 100 is shown in FIGS.

Figure 16B:
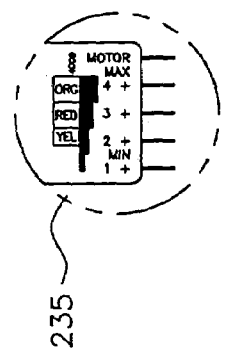
FIG. 16B is an enlargement of the element identified by reference numeral 235 in FIG. 16A.
Figure 16A:
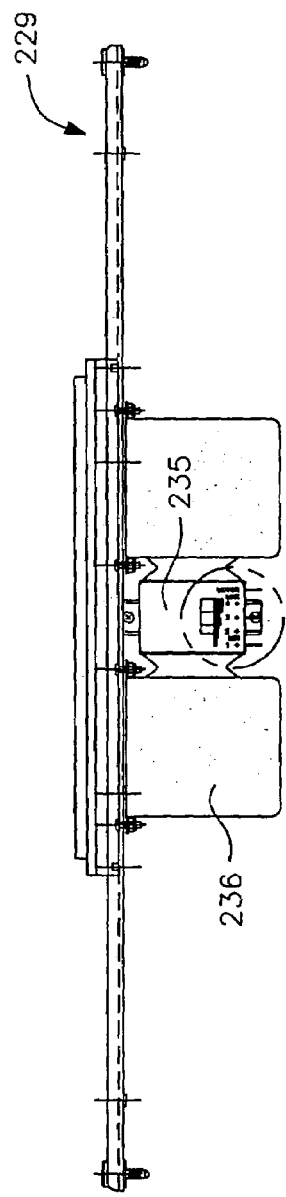
FIG. 16A is a top elevational view of the alternate embodiment of FIG. 15A showing a single blower attached to the face plate.
Figure 16C:
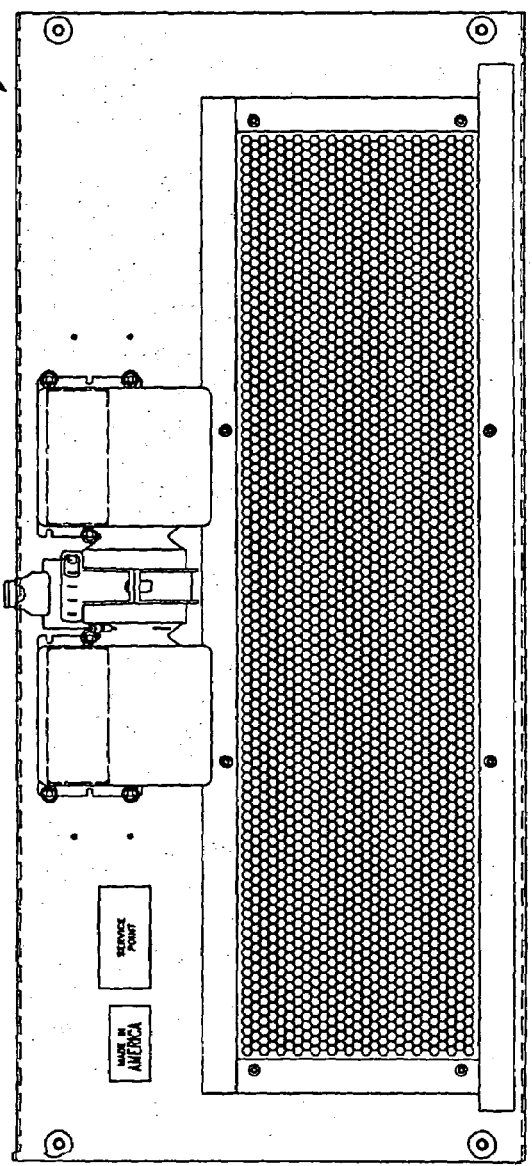
FIG. 16C is a rear elevational view of the alternate embodiment of FIG. 16A.

15A and 15B. As shown, the alternate face plate 228 has a single blower louver 230 and an air inlet grille 232; as with all of the embodiments discussed herein, the air inlet grille may be formed as a single piece with the face plate or may be installed separately as shown in the figures. The corresponding position of the single blower unit 236 with motor 235 mounted to the alternate face plate 228 to form a blower panel subassembly, generally designated by the reference numeral 229, is shown in FIGS. 16A and 16C, and as installed in the second embodiment of the housing 100 in FIGS. 17A and 17B. A more detailed view of the motor 235 is provided in FIG. 16B. The coil subassembly 266 as mounted beneath the single blower unit 236 is also shown in FIG. 17B.

Figure 18A:
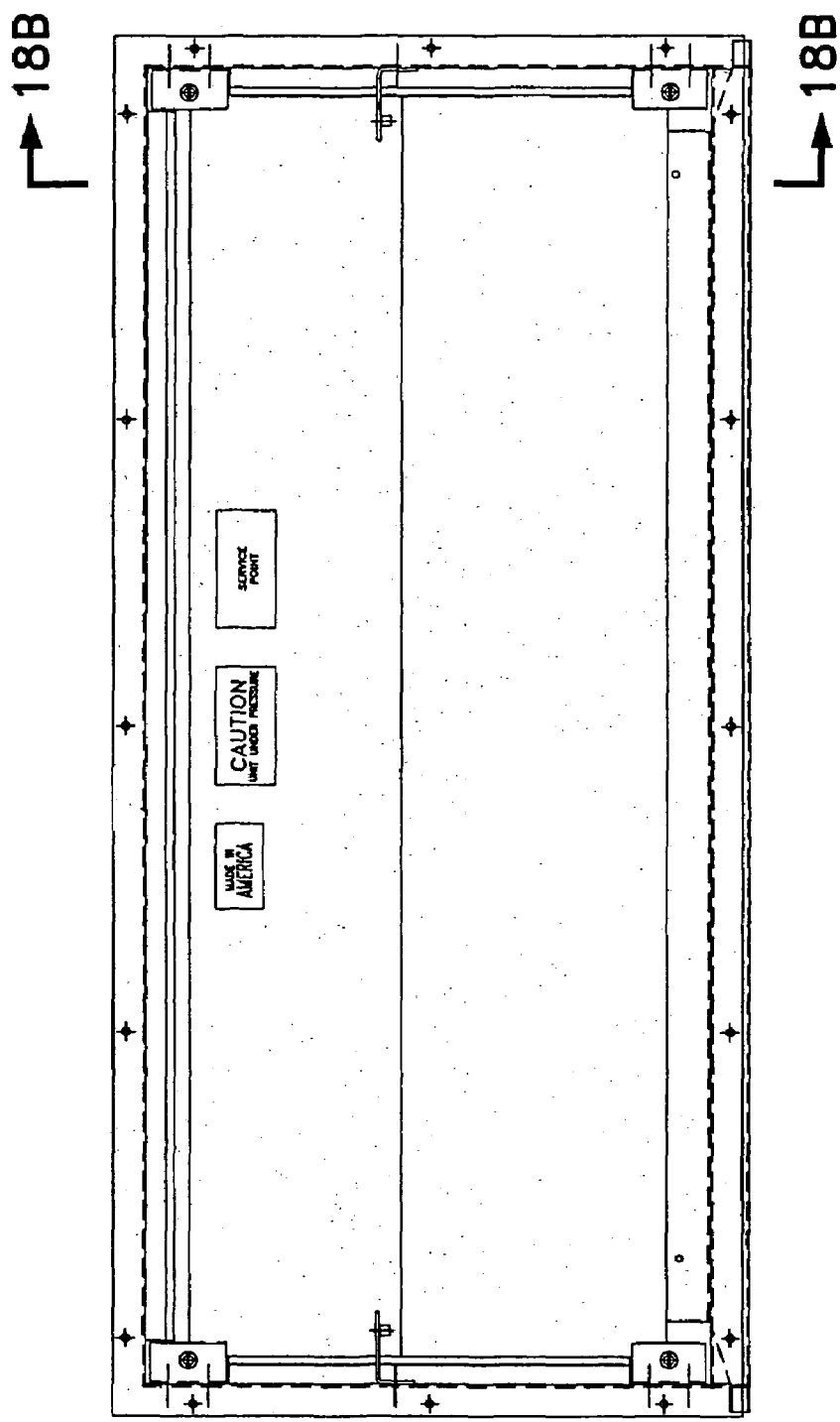
FIG. 18A is a front elevational view of the housing according to the alternate embodiment of FIG. 17A.

The housing compartment for receiving the coil and blower panel subassemblies, and the elements for mounting the coil subassembly and the face plate, are shown in FIGS. 18A, 18B and 18C, with the coil subassembly being mounted within the housing compartment and connected through bulkhead fittings 88 to the remotely located compressor/condensor units in the same manner as shown in FIGS. 14A and 14B.

As illustrated by the differences between the face plates of the first and second embodiments, the face plate may have varying dimensions and may be constructed to accommodate single or dual blower units. Additional blowers could also be built into a particular face plate embodiment should space be available in the intended vehicle mounting location.

As described herein, the evaporator assembly may be implemented with any type of compressor and condenser arrangement. In a preferred embodiment, a dual compressor system is used. Further preferred embodiments can include the use of TM-21X heavy duty compressors made by Seltec Selective Technologies of Dallas, Tex. In addition, the present invention will preferably use a SMC3L skirt mounted condenser such as that made by Trans/Air Mfg. Corp. of Dallastown, Pa.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A self-contained evaporator assembly for mounting within a vehicle bulkhead of a high occupancy passenger vehicle having an external configuration comprising:
   a generally rectangular housing configured to be mounted within the bulkhead inside the vehicle without alteration of the external configuration of said vehicle, said housing having a front opening;
   a coil subassembly mounted within said housing through said front opening;
   a blower panel subassembly fitting within and covering said front opening of said housing; and
   connection elements configured to couple said coil subassembly to compressor and condenser units that are spaced away from and outside said housing.

2. The self-contained evaporator assembly as set forth in claim 1, wherein said blower panel subassembly includes at least one blower unit with a motor mounted to a face plate, said blower panel subassembly being removable from said housing as a unit.

3. The self-contained evaporator assembly as set forth in claim 2, wherein said blower panel subassembly further includes a blower louver positioned adjacent an output of said blower unit, and an air inlet grille covering an air input to said coil subassembly.

4. The self-contained evaporator assembly as set forth in claim 1, wherein said connection elements include hoses passing through apertures in lateral walls of said housing.

5. The self-contained evaporator assembly as set forth in claim 1, wherein said connection elements include bulkhead connectors coupled through apertures in lateral walls of said housing.

6. The self-contained evaporator assembly as set forth in claim 1, wherein said housing includes a top wall, a rear wall, two lateral walls and a floor pan that together define a generally rectangular enclosure having a front opening for receiving and flush mounting said blower panel subassembly and said coil subassembly within the vehicle bulkhead, said floor pan having two downwardly sloping surfaces that meet to form an inverted apex, at least one of said lateral walls having an aperture for coupling said coil subassembly to distally located compressor and condensor units, and both lateral walls of said housing having a respective drain aperture adjacent each end of said inverted apex for fluid exit from said housing.

7. An evaporator assembly housing for an air conditioning unit suitable for installation in a vehicle having an external configuration, said housing containing an evaporator assembly having a coil subassembly and a blower panel subassembly, said housing comprising a generally rectangular enclosure configured to receive the coil and blower panel subassemblies within a bulkhead of said vehicle, said enclosure having a front opening for receiving said coil and blower panel subassemblies, said housing having a floor pan with two downwardly sloping surfaces that meet to form an inverted apex, both lateral walls of said housing having a respective drain aperture adjacent each end of said apex for fluid exit from said housing, said housing with said evaporator assembly being configured for self-contained installation in said bulkhead without alteration of the vehicle's external configuration.

8. The evaporator assembly housing as set forth in claim 7, wherein said coil subassembly is coupled to compressor and condensor units distally located outside of said housing.

9. The evaporator assembly housing as set forth in claim 8, wherein said enclosure includes apertures in said lateral walls for accommodating coupling elements for connecting said coil subassembly to said distally located compressor and condenser units.

10. The evaporator assembly housing as set forth in claim 9, wherein said coupling elements include hoses and hose grommets.

11. The evaporator assembly housing as set forth in claim 9, wherein said coupling elements include bulkhead connectors.

12. The evaporator assembly housing as set forth in claim 7, wherein said two sloping surfaces are of unequal width such that said apex is offset from a longitudinal centerline of said floor pan.

13. The evaporator assembly housing as set forth in claim 12, wherein said apex is offset toward a rear wall of said enclosure.

14. The evaporator assembly housing as set forth in claim 7, wherein an upper wall thereof includes a chamfered surface to facilitate installation of said housing within said bulkhead.

15. The evaporator assembly housing as set forth in claim 14, wherein said chamfered surface includes a beveled rear surface portion that slopes downwardly toward a rear wall of said housing.

16. The evaporator assembly housing as set forth in claim 15, wherein said chamfered surface further includes beveled side surface portions that slope downwardly toward the lateral walls of said housing.

17. The evaporator assembly housing as set forth in claim 14, wherein said chamfered surface includes beveled side surface portions that slope downwardly toward the lateral walls of said housing.

18. The evaporator assembly housing as set forth in claim 7, wherein said housing is made of a single piece of aluminum folded to form inwardly directed flanges.

19. The evaporator assembly housing as set forth in claim 7, wherein said two sloping surfaces are of equal width such that said apex is generally aligned with a longitudinal centerline of said floor pan.

20. The evaporator assembly housing as set forth in claim 7, wherein said blower panel subassembly includes a face plate for covering said front opening, said face plate having a blower louver and an air inlet grille adjacent and in communication with a blower unit and the coil subassembly, respectively, for air circulation therethrough.

21. The self-contained evaporator assembly as set forth in claim 1, wherein said vehicle is a bus and said bulkhead is in an area above a prime mover of said bus.

22. The evaporator assembly housing as set forth in claim 7, wherein said vehicle is a bus and said bulkhead is in an area above a prime mover of said bus.

23. The self-contained evaporator assembly as set forth in claim 1, wherein said vehicle is a bus having a passenger area, said evaporator assembly being mounted below a roof line of the bus and above said passenger area.

24. The evaporator assembly housing as set forth in claim 7, wherein said vehicle is a bus having a passenger area, said evaporator assembly being mounted below a roof line of the bus and above said passenger area.

* * * * *